US008069685B2

(12) United States Patent
Nam et al.

(10) Patent No.: US 8,069,685 B2
(45) Date of Patent: Dec. 6, 2011

(54) CAPACITY MODULATION COMPRESSOR AND AIR CONDITIONING SYSTEM HAVING THE SAME

(75) Inventors: Hyuk Nam, Masan-si (KR);
Kang-Wook Lee, Changwon-si (KR);
Seung-Hyoung Ha, Changwon-si (KR);
Geun-Hyoung Lee, Busan (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 12/320,071

(22) Filed: Jan. 15, 2009

(65) Prior Publication Data
US 2010/0017037 A1    Jan. 21, 2010

(30) Foreign Application Priority Data
Jul. 16, 2008   (KR) .................. 10-2008-0069309

(51) Int. Cl.
*F25B 49/00*    (2006.01)
*H02K 21/12*    (2006.01)
*H02P 23/00*    (2006.01)

(52) U.S. Cl. ............. 62/228.1; 62/510; 310/156.84; 318/784; 318/795

(58) Field of Classification Search .............. 62/175, 62/228.1, 228.5, 510; 310/156.83, 156.84; 318/784, 794, 795
See application file for complete search history.

(56) References Cited

U.S. PATENT DOCUMENTS

| 5,097,166 | A | * | 3/1992 | Mikulic | 310/156.83 |
| 7,923,881 | B2 | * | 4/2011 | Ionel et al. | 310/156.83 |
| 2003/0230098 | A1 | * | 12/2003 | Moon et al. | 62/175 |
| 2008/0223057 | A1 | * | 9/2008 | Lifson et al. | 62/228.4 |

FOREIGN PATENT DOCUMENTS
KR   10-2006-0120387   11/2006
* cited by examiner

*Primary Examiner* — Marc Norman
(74) *Attorney, Agent, or Firm* — McKenna Long & Aldridge LLP

(57) ABSTRACT

Provided is an air conditioning system comprised of a plurality of indoor units connected to each other in parallel, each having an expansion valve, and an outdoor unit including a plurality of compressors, in which at least one of the compressors provided to the outdoor unit is a capacity modulation compressor including an electromotive driving unit for driving a plurality of compression units capable of selectively compressing a working fluid, and the electromotive driving unit for the capacity modulation compressor has a stator with a coil wound around thereon and a rotor rotating inside the stator, the rotor being an LSPRM including a rotor core, flux barriers, permanent magnets and conductive bars.

14 Claims, 18 Drawing Sheets

CAPACITY MODULATION COMPRESSOR AND AIR CONDITIONING SYSTEM HAVING THE SAME

This application claims the benefit of Korean Patent Application No. 10-2008-0069309 filed on Jul. 16, 2008, which is hereby incorporated by reference in its entirety as if fully set forth herein.

FIELD OF THE INVENTION

The present invention relates in general to an air conditioning system. More particularly, the present invention relates to a multi-type air conditioning system provided with a plurality of indoor units, capable of controlling the compressive load on an outdoor unit in response to the cooling capacity required of each indoor unit. Yet in further detail, the present invention relates to an air conditioning system capable of controlling the compressive load on a working fluid (e.g., refrigerant, refrigerant oil etc.) utilizing a compression mechanism, not a high cost inverter driver, which consists of a plurality of capacity modulation compressors.

BACKGROUND OF THE INVENTION

In general, a single phase induction motor includes a stator wound around with a main coil and a sub-coil which are physically spaced 90° apart from each other, and a supply power is applied directly to the main coil, while indirectly (i.e., via a capacitor and a switch) to the sub-coil. This is because the single phase induction motor would not start even if a voltage is applied to the main coil. Therefore, a starting device such as the sub-coil is needed to create a rotor system at the stator, thereby starting or actuating the rotor.

There are many types of starting devices, for example, split phase start type, shaded coil start type, capacitor start type, repulsion start type, etc.

An capacitor start-type single phase induction motor is described as an example of a single phase induction motor, with reference to FIG. 1 and FIG. 2.

FIG. 1 illustrates a stator 10 and a rotor 20 in a conventional single phase induction motor, and FIG. 2 illustrates a simple circuit having a rotor coil and a stator coil.

When a main coil 12 is the only coil wound around the stator 10, only an alternating magnetic field is produced by the stator 10 and thus the rotor 20 does not start. However, when a sub-coil 14 is also wound around the stator to produce a rotating magnetic field whereby the rotor starts running or rotating in a certain direction. That is to say, the rotating magnetic field generates a starting torque.

Meanwhile, a capacitor 15 causes a phase delay of current being applied to the sub-coil 14 to generate a starting torque through the interaction with the main coil 12. Once started, if there is not going to be any change in a load, the rotor keeps rotating even if the sub-coil is not fed with power. Therefore, once the rotor started and keeps running at certain RPM or higher, it is all right to stop the power supply to the sub-coil. However, if the load is variable, a starting torque is needed. In this case, the sub-coil must always be provided with power through the capacitor.

On the contrary, a three-phase induction motor where a rotation system is easily created even by winding only the main coil around a stator, there is no need to wind the aforementioned sub-coil around the stator. In other words, a separate starting device is not necessary for the three-phase induction motor.

However, the single phase induction motor offers a competitive advantage over others in terms of price in that it does not require an inverter drive component of a BLDC (brushless DC) motor or a reluctance motor and can start up with the help of a common single phase power source.

Referring to FIG. 1 and FIG. 2, the detail description of the general single phase induction motor will be followed.

The stator 10 has a hollow interior space, an inner periphery of which is provided with a plurality of teeth 11 arranged at a predetermined angle interval, each being protruded inwardly in a radius direction and each being wound with the main coil 12 to have N-polarity or S-polarity at the application of a primary current.

An insulator (not shown) is provided between each of the teeth 11 and the main coil 12 to insulate between the tooth and the main boil and to facilitate the winding of the main coil.

The stator 10 also includes the sub-coil 14 that is wound physically spaced apart from the main coil 12 at a predetermined angle to produce a rotating magnetic field when current is applied thereto. Of course, the sub-coil is wound around the teeth 11 via the insulator, and the main coil 12 and the sub-coil 14 together are called a stator coil or simply a coil.

The coils 12 and 14 are connected to a single phase power source, in parallel to each other. Moreover, the sub-coil is serially connected to the capacitor 15. Although not shown, the capacitor may be connected selectively to the power source through a switch.

Generally, a squirrel cage rotor is used most in the field, so the rotor 20 shown in FIGS. 1 and 2 represent the squirrel cage rotor.

The rotor 20 is formed by stacking a plurality of identically shaped steel sheets, each steel sheet having a plurality of slots 21 formed at a predetermined angle interval along the outer circumference at a predetermined radial position from the core. In addition, the rotor 20 includes conductive bars 22 inserted into the slots 21 of the rotor core, and the conductive bar is usually made out of copper or aluminum.

In order to cause an electrical short through the conductive bars, both ends of the squirrel cage rotor are connected by an end ring (not shown in FIGS. 1 and 2, referred to FIGS. 11 and 12 later), and the end ring is typically formed by an aluminum die casting process. That is, the conductive bar 22 and the end ring are integrated through aluminum die casting, and the end ring is formed at the upper and lower portions of the rotor core, respectively. Meanwhile, an axial bore 24 is formed in the core of the rotor 20, and a shaft (not shown) transferring torque of the rotor to other components is press fitted into the axial bore such that the rotor and the shaft can rotate in one unit.

According to how the single phase induction motor with the above configuration works, when power is applied to the coil, an induced current is produced in the conductive bars 22, through which an induction torque is generated to rotate the motor. In this case, however, a loss occurs in a the conductive bars 22, the loss is so called a conductive bar loss. Because of the conductive bar loss, there is a limitation in enhancing the efficiency of a motor with a fixed size. Therefore, single phase induction motors were not suitable, sometimes useless, for high-efficiency work.

Besides, the rotor 20 gets hot because of the conductive bar loss, and such a temperature change of the rotor in turn made the loss even higher. In other words, the conductive bar loss gets worse as the temperature of the rotor increases. This remained as another limitation in improving the efficiency of a motor at high temperature.

In the meantime, it is known that the single phase induction motor, by its nature, should always run slower than a preset synchronous speed, to be able to produce an induced torque. This is because, theoretically, the amount of torque of the single phase induction motor stays zero at the synchronous speed, and it tends to increase at low RPMs.

In short, a problem arises in the single phase induction motor in relation to the control of the motor in response to a change in the motor load since the speed of the motor shaft, i.e., the motor speed, varies with the load on the motor, i.e., the load on the motor shaft.

DISCLOSURE

Technical Problem

The present invention is directed to an air conditioning system; and more particularly, to an air conditioning system provided with a plurality of indoor units and one outdoor unit, in which the air conditioning system is capable of selectively operating indoor units and selectively controlling a compressive load on the outdoor unit depending on operation mode of each indoor unit.

Technical Solution

The present invention provides an air conditioning system, which comprises a plurality of indoor units connected to each other in parallel, each having an expansion valve, and an outdoor unit including a plurality of compressors, wherein at least one of the compressors provided to the outdoor unit is a capacity modulation compressor including an electromotive driving unit for driving a plurality of compression units capable of selectively compressing a working fluid; and wherein the electromotive driving unit for the capacity modulation compressor has a stator with a coil wound around thereon and a rotor rotating inside the stator, the rotor being a line start permanent magnet reluctance motor (LSPRM) having a rotor core, flux barriers, permanent magnets and conductive bars.

According to another aspect of the present invention, each of the plurality of compressors includes one capacity modulation compressor and one fixed capacity compressor.

According to another aspect of the present invention, the system further includes a controller for controlling a compressing capacity of the capacity modulation compressor and for selectively operating the capacity modulation compressor and the fixed-capacity compressor, so as to modulate the whole compressing capacity of the modulation compressor and fixed-capacity compressor in multiple steps.

According to another aspect of the present invention, the fixed capacity compressor includes an inductor motor or a line start permanent magnet reluctance motor (LSPRM), as an electromotive driving unit.

According to another aspect of the present invention, the outdoor unit is provided with two capacity modulation compressors, each being driven by an LSPRM.

According to another aspect of the present invention, the two capacity modulation compressors have different capacity values from each other.

According to another aspect of the present invention, the system further includes a controller for controlling the operation mode and compressing capacity of each of the capacity modulation compressors, so as to modulate a total compressing capacity of the capacity modulation compressors in multiple steps.

According to another aspect of the present invention, the electromotive driving unit for the capacity modulation compressor includes a capacitor which has an optimized compressing capacity as the rotor produces a torque for a compression unit to be able to compress a working fluid at a maximum compressing capacity, and which is connected to the stator coil.

According to another aspect of the present invention, a compression capacity of the compression unit is modulated to make a load torque less than a starting torque of the rotor during a startup applied to the compression unit.

According to another aspect of the present invention, the electromotive driving unit for the capacity modulation compressor includes two or more capacitors connected to each other in parallel, and a switch for controlling a short state of the capacitor.

According to another aspect of the present invention, during a startup, a compressing capacity of the compression unit of the capacity modulation compressor is modulated to generate a load torque lower than a starting torque generated in summation of capacities of capacitors after the switch is turned on.

According to another aspect of the present invention, the system further includes a controller for controlling a compression unit, so that during a startup a compressing capacity of the capacity modulation compressor generates a load torque lower than a starting torque generated in summation of capacities of capacitors after the switch is turned on.

According to another aspect of the present invention, the system further includes a controller for controlling a compressing capacity of the compressor depending on the operation mode of each of the plurality of indoor units.

Further the present invention also provides an air conditioning system provided with a plurality of compressors, a condenser, a four-way valve, and a plurality of heat exchangers, wherein at least one of the plurality of compressors is a capacity modulation compressor comprising: an electromotive driving unit including a stator having a coil winding portion to which power is supplied, and rotor which has conductive bars, flux barriers, permanent magnets inserted in the flux barriers, rotates due to interactive electromagnetic forces, an induction torque generated between the conductive bars and the coil winding portion of the stator, an reluctance torque generated between flux barriers and the coil winding portion of the stator and a magnetic torque generated between the permanent magnetic and the coil winding portion of the stator, and has different load torques assigned in a startup operation and in a normal operation, and a capacitor electrically connected to the coil winding portion; a compression unit with a variable compressing capacity in compression of a working fluid; and a controller for controlling operation of a plurality of heat exchangers, and for controlling operation of a plurality of compressors and a compressing capacity of a capacity modulation compressor according to a change in a required cooling capacity for the plurality of heat exchangers, so as to modulate a total capacity of the plurality of compressors in multiple steps.

According to another aspect of the present invention, the plurality of compressors includes one fixed capacity/fixed speed compressor and one capacity-modulated compressor, and a combination of compressing capacities of the plurality of compressors is modulated linearly.

According to another aspect of the present invention, the plurality of compressors includes two or more capacity modulation compressors, and a combination of compressing capacities of the plurality of compressors is modulated linearly.

According to another aspect of the present invention, the plurality of compressors includes one inverter compressor and one capacity-modulated compressor, and a combination of compressing capacities of the plurality of compressors is modulated linearly.

According to another aspect of the present invention, the capacity modulation compressor comprises a plurality of rotary compression units, and at least one of the rotary compression units includes a vane slit in which a vane is inserted, a back pressure space communicating with the vane slit from an external diameter side of the vane slit, and a vane control unit for supplying a suction pressure or a discharge pressure to a rear face of the vane to support the vane and for supplying a discharge pressure to a lateral face of the vane at the same time, such that a difference between the pressure applied to the rear face of the vane and the pressure applied to the lateral face of the vane makes the vane bound or released, thereby making the vane press-welded to or separated from a rolling piston, and wherein a total compressing capacity of the compression units is modulated by controlling the operation mode of at least one of the rotary compression units.

According to another aspect of the present invention, the vane control unit includes a back pressure connection pipe via which a working fluid is introduced into the back pressure space; a low-pressure connection pipe connected to the back pressure connection pipe, via which a low-pressure non-compressed working fluid flows; a high-pressure connection pipe connected to the back pressure connection pipe, via which a high-pressure compressed working fluid flows; a valve for opening/closing the low-pressure connection pipe; and a valve for opening/closing the high-pressure connection pipe.

According to another aspect of the present invention, the vane control unit includes a back pressure connection pipe via which a working fluid is introduced into the back pressure space; a low-pressure connection pipe connected to the back pressure connection pipe, via which a low-pressure non-compressed working fluid flows; a high-pressure connection pipe connected to the back pressure connection pipe, via which a high-pressure compressed working fluid flows; a switch valve for regulating the flow of a working fluid being introduced into the back pressure space through the back pressure connection pipe.

According to another aspect of the present invention, the capacity modulation compressor includes a plurality of rotary compression units, a suction pipe passing through a casing to let a working fluid intaken by a cylinder, and a suction valve installed on the suction pipe to open or close the suction pipe, such that a total compressing capacity of the compression units varies depending on whether the suction valve is open or closed.

According to another aspect of the present invention, during a startup of the capacity-modulated compressor, a compressing capacity of the compression unit is lowered and a smaller load is applied to the electromotive driving unit.

Further the present invention still provides a method of controlling a capacity-modulated compressor, comprising the steps of: receiving an input data on a required cooling capacity for an outdoor unit; starting an electromotive driving unit of the capacity modulation compressor at a lower load regardless of the required cooling capacity for the outdoor unit; and operating the electromotive driving unit of the capacity modulation compressor at a synchronous speed, under a load corresponding to the required cooling capacity for the outdoor unit.

Yet the present invention still provides a method of controlling an air conditioning system, comprising the steps of: receiving an on/off signal from each of a plurality of outdoor units and receiving an input data on a required cooling capacity for each; determining the operation mode and compressing capacity for each of the plurality of compressors including at least one capacity-modulated compressor, in accordance with the input data on required cooling capacities for the plurality of outdoor units; starting an electromotive driving unit of the capacity modulation compressor at a lower load, regardless of the compressing capacity of the capacity modulation compressor having been determined on the basis of the input data on required cooling capacities for the plurality of outdoor units; and operating the electromotive driving unit of the capacity modulation compressor at a synchronous speed, under the compressing capacity having been determined on the basis of the required cooling capacity for the outdoor unit.

Advantageous Effects

The present invention is directed to an air conditioning system; and more particularly, to an air conditioning system provided with a plurality of indoor units and one outdoor unit, in which the air conditioning system is capable of selectively operating indoor units and selectively controlling a compressive load on the outdoor unit depending on operation mode of each indoor unit.

By the use of at least one capacity-modulated capacitor utilizing a line start permanent magnet reluctance motor instead of an inverter motor, the air conditioning system in accordance with the present invention is able to control the compressive load of a working fluid in the outdoor unit in response to load required of an indoor unit in operation mode.

In addition, the air conditioning system in accordance with the present invention has a competitive advantage in terms of cost savings because it does not require an inverter driver, so that material cost can be cut down substantially, compared with the inverter motor.

Moreover, the air conditioning system in accordance with the present invention can improve the efficiency of the compressor included in the outdoor unit at least 10-15% higher than the efficiency of the compressor driven by a single phase induction motor, thereby demonstrating good performances almost equivalent to an inverter motor.

While the existing single phase induction motor has a low rotation frequency compared to a preset power frequency and suffers reduction in the cooling capacity because of a decrease in the rotation frequency in relation to an increase in temperature and load, the line start permanent magnet reluctance motor runs in synchronous with the power frequency and keeps a constant level of cooling capacity because it has the rotation frequency equal to the power frequency, regardless of variations in its temperature and load.

The other objectives and advantages of the invention will be understood by the following description and will also be appreciated by the embodiments of the invention more clearly. Further, the objectives and advantages of the invention will readily be seen that they can be realized by the means and its combination specified in the claims.

DESCRIPTION OF SPECIFIC EMBODIMENTS

Hereinafter, preferred embodiments of a motor in accordance with the present invention will be set forth in detail with reference to the accompanying drawings FIGS. 3 through 15. In the interest of brevity and convenience for explanation, an inner rotor type motor provided with a rotor rotating inside a stator will be explained, but a motor of the present invention is not limited to the inner rotor type motor.

Figure 1:
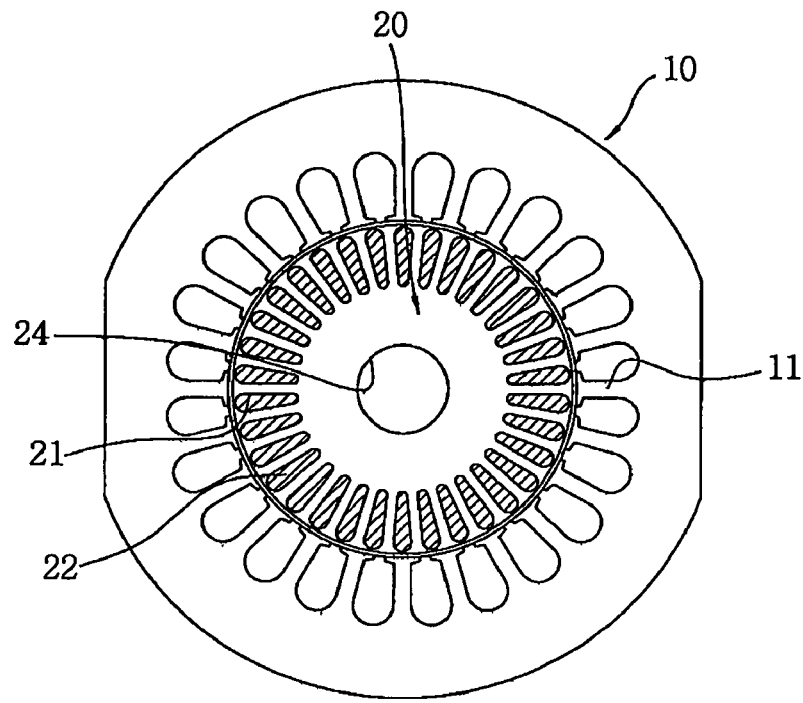
FIG. 1 is a cross-sectional view illustrating a rotor and a stator of a conventional induction motor.
Figure 2:
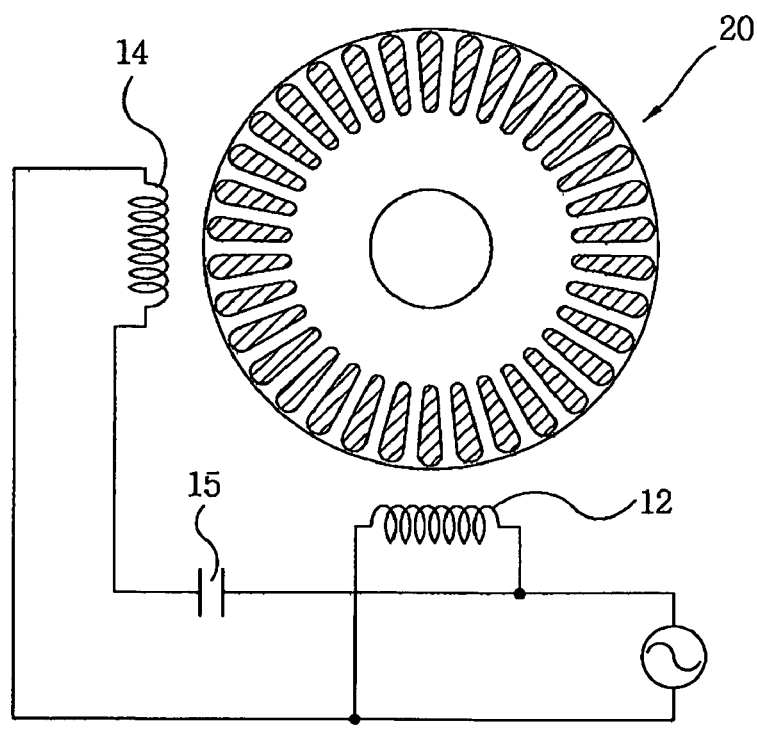
FIG. 2 is a conceptual view briefly illustrating a rotor and a stator coil of a conventional induction motor.
Figure 3:
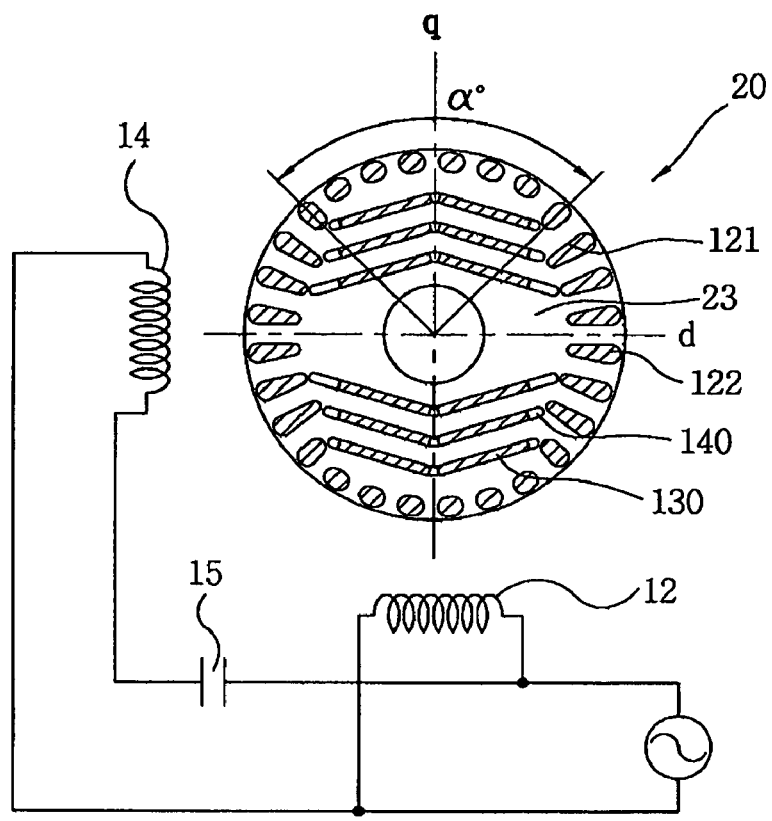
FIG. 3 is a conceptual view briefly illustrating a rotor and a stator coil circuit included in a motor in accordance with the present invention.

A motor in accordance with the present invention is configured the same way as a regular induction motor in a prior art, in which a rotor 120 starts running by an induction torque. That is, the motor adopts the configuration of the induction motor, as shown in FIG. 3, which includes a rotor 120 with slots 121 and conductive bars 122, a stator coil 112 and 114 (hereinafter referred to as a 'coil') for the rotation of the motor, and a capacitor 115. Therefore, any descriptions below will not elaborate on the same configuration between two motors.

Meanwhile, the motor in accordance with the present invention includes a flux barrier 140 inside a rotor core 123 to impede flux motion so that a reluctance torque may be generated. Further, the motor in accordance with the present invention includes permanent magnets 130 inside the rotor core 123 to produce flux so that a magnetic torque may be generated.

Therefore, the motor in accordance of the present invention starts to rotate taking on the property of induction motor, but in normal operation mode it operates taking on the property of the synchronous motor. In other words, once the motor has started, the rotor 120 rotates at a preset synchronous speed by the reluctance torque and the magnetic torque. Therefore, unlike any conventional synchronous motors, the motor in accordance with the present invention does not need a complicated, expensive configuration such as an inverter driver, for a startup.

With reference to FIG. 3, the following will now explain in detail about the basic principles for the reluctance torque and magnetic torque generated by a motor in accordance with the present invention.

The principle of reluctance torque generation will be explained first.

As shown in FIG. 3, the flux barrier 140 is formed along q-axis. Here, the flux barrier 140 is formed by removing a part of the rotor core 123, the magnetic substance. That is, an air can be filled in the flux barrier 140, and a nonmagnetic material, e.g., resin, may be filled.

When a current is fed to the coil and magnetic poles are produced accordingly, magnetic flux is also formed in the rotor 130. However, a very high reluctance is generated due to the flux barrier 140 along the q-axis where the flux barrier 140 is formed. On the contrary, a very small reluctance is generated along d-axis where the flux barrier 140 is not formed.

Therefore, the rotor 130 rotates in a direction to minimize such a difference in reluctances in the q-axis and d-axis directions, and this moment causing the rotor 130 to rotate is called a reluctance torque. In effect, a larger difference in the reluctances generates a greater reluctance torque.

Meanwhile, as shown in FIG. 3, the motor in accordance with the present invention may further include permanent magnets 130. Suppose that a current is fed to the coil and an N-magnetic pole is formed. Then the permanent magnet may be magnetized to be the S-magnetic pole. That is, at the position of the rotor 120 shown in FIG. 3, the reluctance in the q-axis direction becomes much smaller because of a offsetting between the flux produced by the stator and the flux produced by the permanent magnets. In this way, the difference in reluctances in the q- and d-axis directions can be made even greater compared to a case with no permanent magnets available. As such, a greater amount of reluctance torque can be generated, as compared to the case with no permanent magnets available.

Moreover, the permanent magnet 130, by its nature, generates a magnetic torque through the interaction with the stator 110. That is, when a pole is formed in the stator 110 by the applied current to the coil, the pole produced in the stator 110 interacts with the pole of the permanent magnets 130 because of a relative positional relationship between the permanent magnets 130 and the rotor 120, and a magnetic torque is consequently generated.

As noted earlier, the motor in accordance with the present invention is designed to have a synchronous rotation, after its startup, by both reluctance and magnetic torque, so it demonstrates a very high efficiency performance in normal operation mode. This means that under the same circumstances such as the same motor size and the same current intensity, the motor in accordance with the present invention achieves a very high efficiency performance, as compared with the conventional induction motor.

Figure 4:
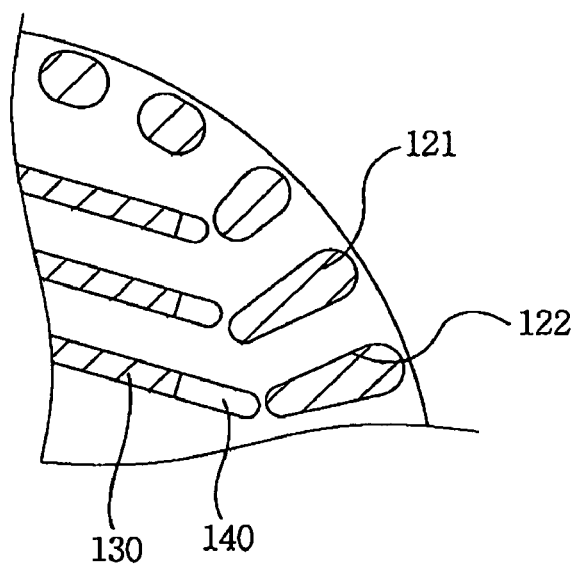
FIG. 4 is an enlarged cross-sectional view of a portion taken out of the rotor in FIG. 3.

With reference to FIGS. 3 through 5, the following will now explain in detail about the configuration of a rotor included in the motor in accordance with the present invention.

The rotor 120 includes a rotor core 123 as its basic structural component, and a flux barrier 140 formed at the rotor, more specifically, at the rotor core 123.

Then, there is a q-axis formed in a radius direction from the center of the rotor, along which flux flow being impeded through the flux barrier 140. And there is a d-axis formed in a radius direction from the center of rotor, along which flux flow is not impeded.

Alternatively, the rotor may include a plurality of flux barriers arranged in the circumference direction of the rotor to form an even number (at least two or more) of poles as depicted in FIG. 3. As an example, if the flux barriers are arranged to form two poles, the q-axis lies at right angles to the d-axis as in FIG. 3. If the flux barriers are arranged to form four poles, though not shown, the q-axis lies at 45 degrees to the d-axis.

Another thing to notice in FIG. 3 is that the flux barriers 140 are preferably formed to be symmetric with respect to the q-axis. By this configuration, the reluctance torque is made symmetric with the q-axis and the occurrence of noises or vibrations due to the deviation of reluctance torque can be prevented.

Further, the flux barrier 140 preferably has a structure having at least two layers. As an example, at least two flux barrier layers may be formed over the upper and lower faces of the rotor shown in FIG. 3. This structure enables to increase the percentage of area occupied by the flux barriers 140 in the rotor core 123 in the q-axis direction, and therefore raises the reluctance in the q-axis direction.

For the same reason, it is more desirable to arrange the flux barriers 140 more distant from or closer to an axis that is orthogonal to the q-axis. In other words, instead of forming the flux barriers 140 parallel to the d-axis as shown in FIG. 3, it is more preferable to make the flux barriers 140 have a convex upward configuration or a concave downward configuration with respect to the d-axis. Such configuration of the flux barriers 140 may be angulated or may form an arc shape.

Moreover, as shown in FIG. 3, the flux barriers 140 located nearer to the center of the rotor, or the flux barriers 140 formed on an inner side, are longer in order to increase the reluctance in the q-axis direction even more.

Meanwhile, the conductor bars 122 positioned within an angle ($\alpha$) between both ends of the outermost flux barrier 140 and the center of the rotor have a smaller width in the radius direction than that of other conductive bars. It is so because a gap between the conductive bar 122 and the flux barrier 140 will become very narrow if the radial width of the conductive bars 122 provided within the angle ($\alpha$) increases. As such, a leakage flux is highly likely to occur due to flux saturation in the d-axis direction. That is, in order to stably secure a sufficient gap, the radial width of the conductive bars 122 provided within the angle ($\alpha$) should be reduced.

Referring now to FIG. 4 and FIG. 5, an end of the flux barrier 140 is very close to and faces the slot 121. That is to say, a gap between the end of the flux barrier 140 and the slot 121 should be minimized in order to prevent the flux having been formed along the d-axis from leaking through the gap as much as possible. This is because the flux leakage through the gap eventually reduces the reluctance difference in the q- and d-axis directions that much.

Figure 5A:
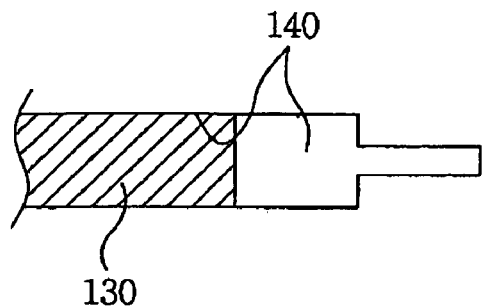
FIG. 5a through FIG. 5c are cross-sectional views illustrating different examples of an end of a flux barrier in FIG. 3.
Figure 5B:
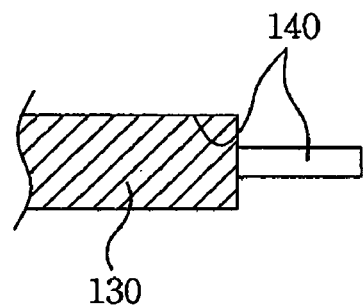
Figure 5C:
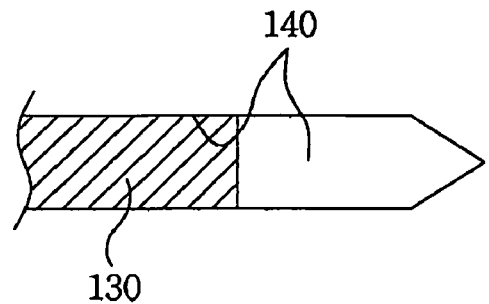

However, there are certain limitations to reduce the gap between the end tip of the flux barrier 140 and the slot 121, or the gap between the end tip of the flux barrier 140 and the conductive bar 122 formed in the slot 121. This is because the gap portion could be burst out under pressure when the conductive bars 122 are formed in the slots 121 by aluminum die casting, only to introduce molten aluminum to the flux barriers 140. Therefore, to get rid of such worries and yet to obtain a sufficiently small gap, the end tip of the flux barrier 140 should be smaller in width than other areas. Examples of this are shown in FIGS. 5a through 5c. Through those examples, one can minimize a distance between the flux barrier 140 and the slot 121 facing each other and minimize an area that can possibly burst out under pressure, thereby reducing the gap that much.

Meanwhile, the motor in accordance with the present invention includes permanent magnets 130 provided to produce flux inside the rotor core and further a magnetic torque. As depicted in FIG. 3 and FIG. 4, the permanent magnets 130 can be inserted into some of the flux barriers 140. Needless to say, the permanent magnets 130 can be inserted into all layers of the flux barrier 140, or the permanent magnets 130 may not be inserted into particular layers of the flux barrier 140.

The flux barrier 140 may be formed continuously in a longitudinal direction. Preferably, two or more permanent magnets 130 should be provided to one flux barrier 140 in a continuous form along the longitudinal direction. This is done so because it is very hard to form a single permanent magnet 130 that fits the configuration of the flux barrier, and because plural permanent magnets 130 are more advantageous and more effective to minimize the flux leakage produced by them alone.

For the same reasons, there are at least two permanent magnets 130 provided in the longitudinal direction of the rotor 120, namely, in the height direction of the rotor 120.

Because of these particular requirements, substantially uniform shaped (e.g., bar-shaped) unit permanent magnets are eligible for the permanent magnets 130 for the present invention. Moreover, the use of bar-shaped unit permanent magnets contributes to a cost reduction in the fabrication of permanent magnets, and application of a minimal number of parts that leads to an easier and simplified manufacturing process.

Figure 7:
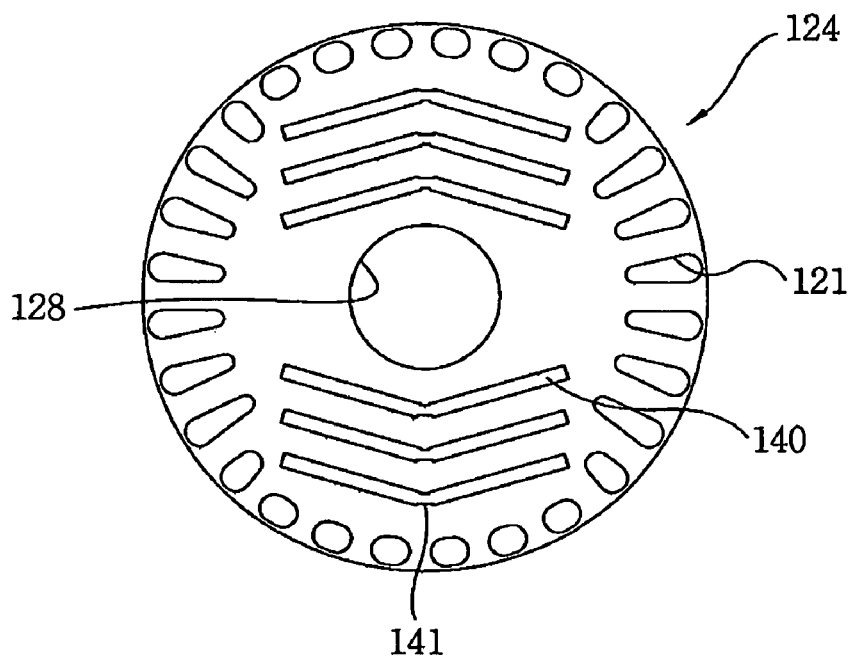
FIG. 7 is a plan view of the uppermost layer of a rotor core unit for a motor in accordance with one embodiment of the present invention.

In addition, the flux barrier 140 has a specific seat portion to define the location of the permanent magnet 130. In other words, a stepped portion 141 as illustrated in FIG. 5b and FIG. 7 is formed at the flux barrier 140 to be used as an insertion position of the permanent magnet 130. Such a seat portion also serves to prevent the permanent magnet from moving out of position.

With reference to FIGS. 6 through 12, the following will now explain in detail about a manufacturing method of a motor, a rotor to be more specific, in accordance with the present invention.

Figure 6:
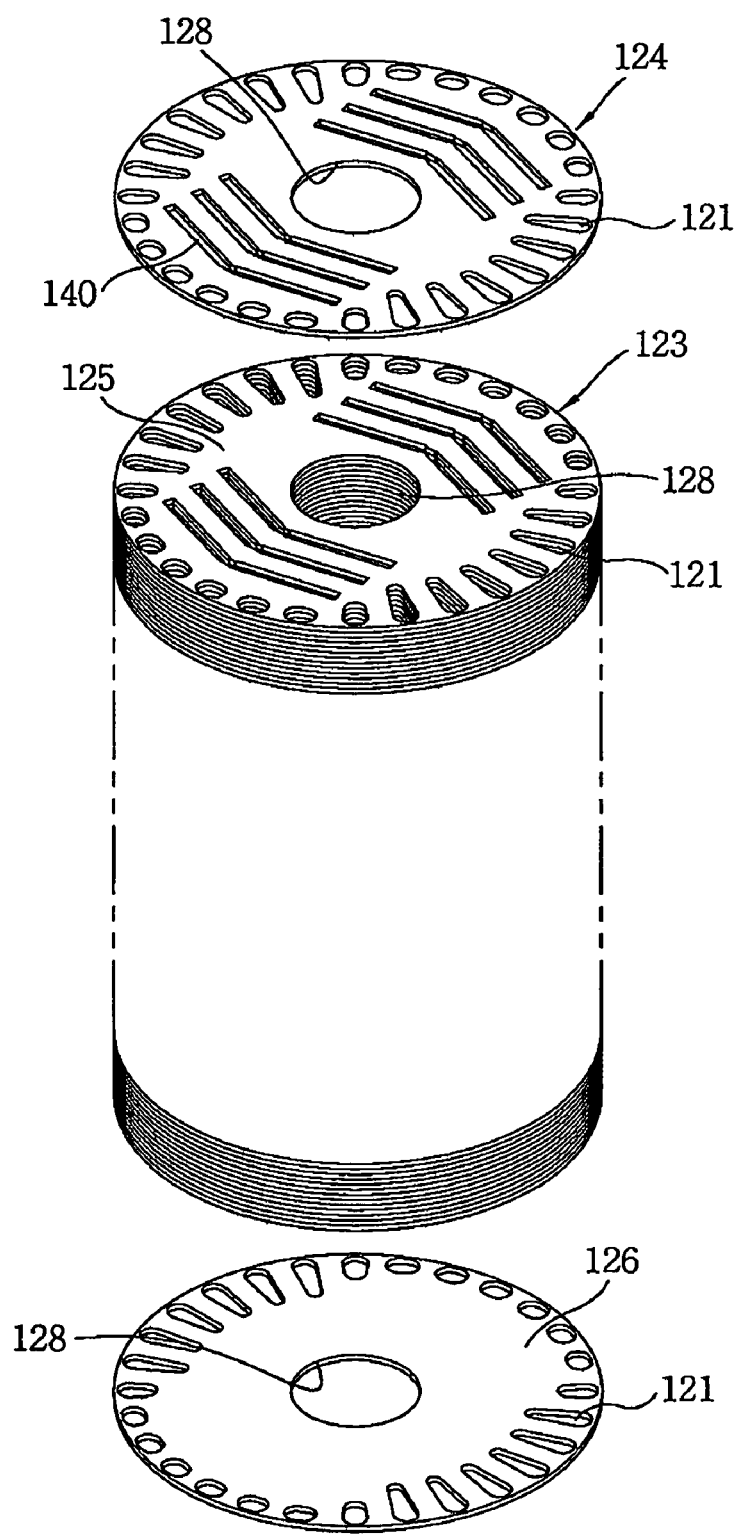
FIG. 6 is an exploded perspective view of a rotor core for a motor in accordance with the present invention.

Referring first to FIG. 6, one embodiment of the motor in accordance with the present invention includes a rotor core 123 composed of three different types of unit rotor cores 124, 125, and 126. This particular type motor shown in FIG. 6 is suitable for a drive motor of a work machine.

The rotor core is prepared by stacking blanked unit rotor cores, and those unit cores may adopt three different configurations.

As noted earlier, the unit core 125 forming the intermediate parts of the rotor core 123 may include slots 121 for housing conductive bars, an axial bore 128 to which a shaft is inserted, and flux berries 140.

Figure 8:
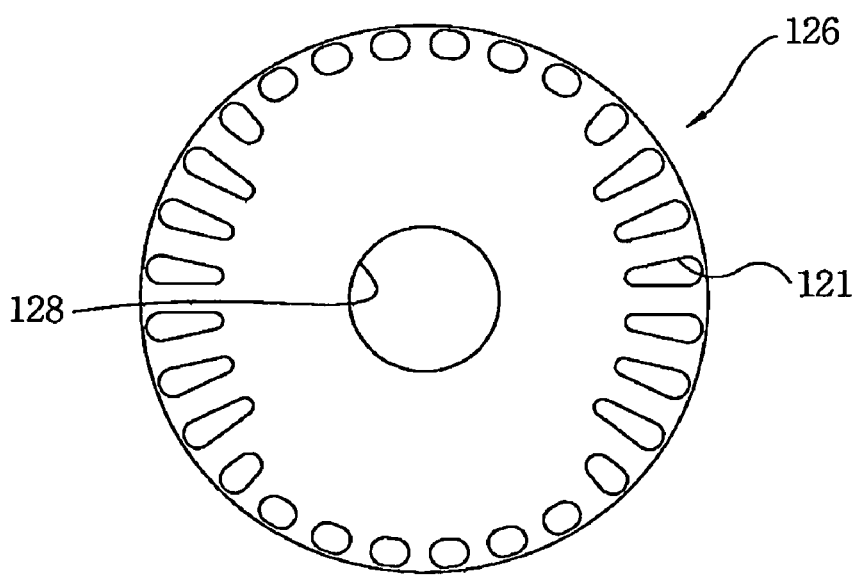
FIG. 8 is a plan view of the lowermost layer of a motor in accordance with one embodiment of the present invention, or a plan view of the uppermost layer of a rotor core unit in accordance with another embodiment of the present invention.

Meanwhile, the unit core 126 forming the lowermost part of the rotor core 123 may include only an axial bore 128 and slots 121, as depicted in FIG. 6 and FIG. 8. In other words, the unit core 126 does not have any flux barriers. In this way, although permanent magnets 130 may be inserted into some of the flux barriers 140 for the unit cores 124 and 125, the unit core 126 ensures that those insert permanent magnets 130 do not come out of place.

Referring to FIG. 6 and FIG. 7, the unit core 124 forming the uppermost part of the rotor core 123 includes an axial bore 128, slots 121, and flux barriers 140. Preferably, the unit core 124 has a minimal number of flux barriers 140 for the insertion of permanent magnets, taking a relationship with an end ring (description will be followed) into consideration.

Therefore, even after the rotor core 123 is prepared in a stacked structure as shown in FIG. 6 and an end ring is formed through aluminum die casting, it is still possible to insert permanent magnets 130 into the flux barriers 140. Further, if the motor can be assembled as shown in FIG. 6, the permanent magnets would not fly off because of the interaction between the inside rotor core 123 and the permanent magnets 130 without necessarily using a special mechanism for preventing the fly-off of the permanent magnets 130.

Figure 9:
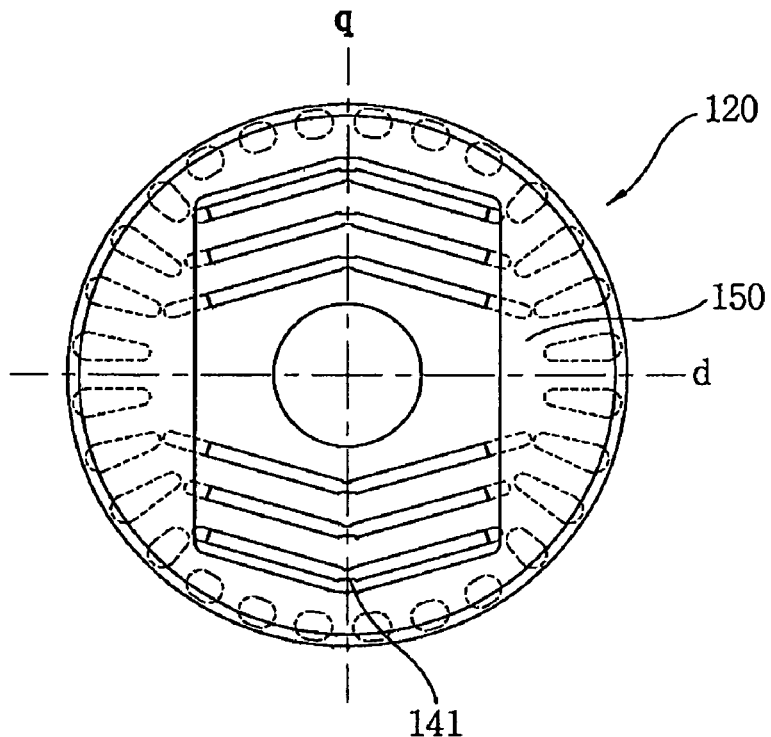
FIG. 9 is a top plan view of a rotor for a motor in accordance with one embodiment of the present invention.
Figure 10:
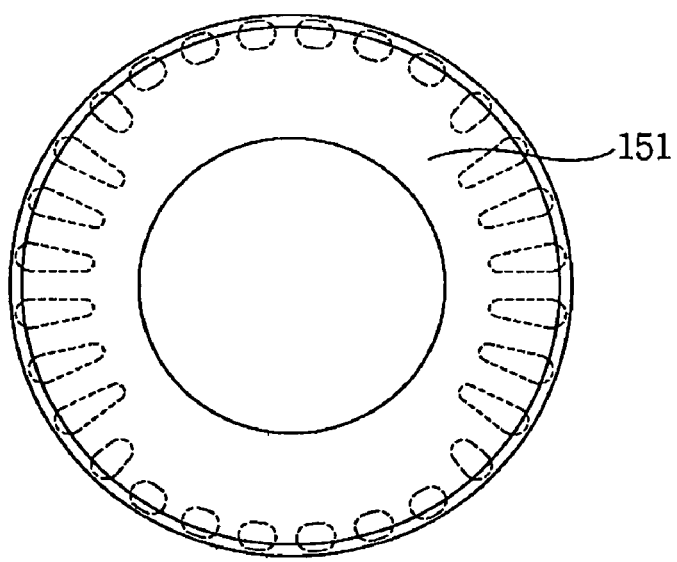
FIG. 10 is a top plan view of a rotor for a motor in accordance with one embodiment of the present invention, or a bottom plan view of a rotor for a motor in accordance with another embodiment of the present invention.
Figure 12:
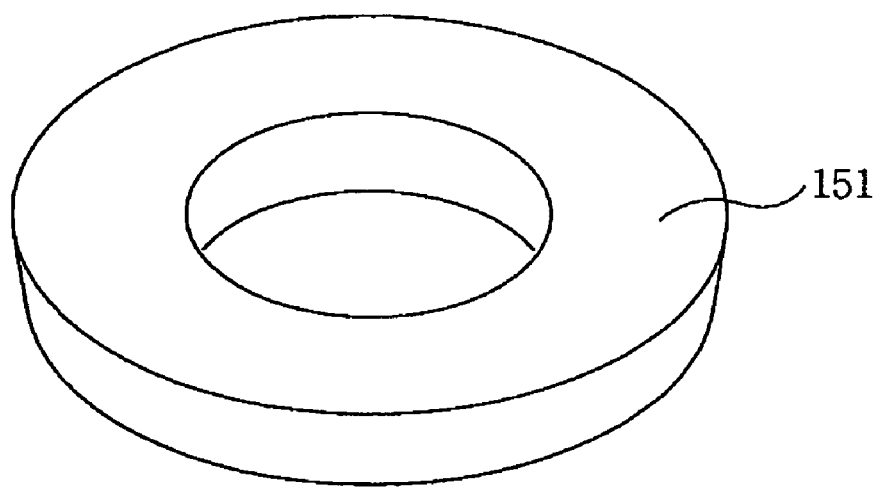
FIG. 12 is a perspective view illustrating only a lower or upper end ring for a motor in accordance with one embodiment of the present invention.

FIG. 9 and FIG. 10 respectively show a plan view and a bottom view of the rotor core discussed so far. In this type of rotor core 123, at least one annular (ring-shaped) end ring 151 in a conventional art may be formed underneath the rotor core 123 as depicted in FIG. 12.

To be short, the rotor 123 of this embodiment is designed in a manner to insert permanent magnets 130 after forming the end ring(s) 151.

The conventional annular end ring may cover both top and bottom faces of the rotor core 123, except for the axial bore 128. In general, an end ring 151 having a greater thickness in the height direction and the width direction is effective for keeping the loss through the end ring to a minimum. That is to say, similar to the loss in conductive bars, the loss produced by the end ring 151 can be minimized.

However, there is a height limitation in the end ring 151 for fear the motor will get bulky. Therefore, it is safer to make the end ring 151 thicker in the width direction in order to minimize the loss produced by the end ring 151.

Meanwhile, the uppermost unit core 124 shown in FIG. 6 can be substituted with the lowermost unit core 126 shown in FIG. 8. That is, the unit core 126 in FIG. 8 can be used for both the uppermost and lowermost unit cores. In effect, this configuration is another possible embodiment of the motor in accordance with the present invention. To make such configuration, a lowermost unit core 126 and an intermediate unit core 125 are stacked first, and permanent magnets 130 are then inserted into flux barriers 140. Next, an uppermost unit core (in this particular case, this is identical with the lowermost unit core) is stacked. Lastly, conductive bars and end rings are formed by aluminum die casting.

FIG. 10 illustrates the bottom view of the rotor core having such configuration. Given that the rotor core has the configuration described above, any conventional annular end rings 151 as shown in FIG. 9 can be provided to the upper and lower portions of the rotor core.

That is, the rotor 120 of this embodiment is designed in a manner to form the end rings 151 after inserting the permanent magnets 130. Therefore, although a motor having the rotor 120 of this embodiment may not be a direct drive type motor, it is still possible to prevent the fly-off of the permanent magnets 130 with the help of the uppermost and lowermost unit cores.

In every configuration of a motor in accordance with the present invention, the end rings 151 are provided not to impede or not to interfere with the performance magnets 130, and form a short circuit with the plural conductive bars 122. Needless to say, the end rings 151 should be provided in a manner not to interfere with the flux barriers 140 also.

That is, in another embodiment of the motor discussed earlier, no flux barrier 140 is formed on the uppermost and lowermost parts of the rotor motor 123. In result, the end rings 151 do not interfere with the flux barriers 140. Therefore, end rings taking on any conventional configuration may be utilized, and the loss produced by the end rings 151 can be minimized.

As described above, however, one embodiment of the motor is designed in a manner to form end rings 150 after a rotor core is formed. Permanent magnets 130 are then inserted into flux barriers 140. Thus, the end rings 150 should not interfere with the permanent magnets 130. In other words, the end rings 150 are formed in such a way that there is a space reserved for the insertion of the permanent magnets 130.

In addition, end rings 150 having a larger radial width are preferred to keep the loss by the end rings 150 to a minimum. In this case, therefore, the uppermost unit core 124 is provided with a minimal number of flux barriers 140 for the insertion of permanent magnets.

Figure 11:
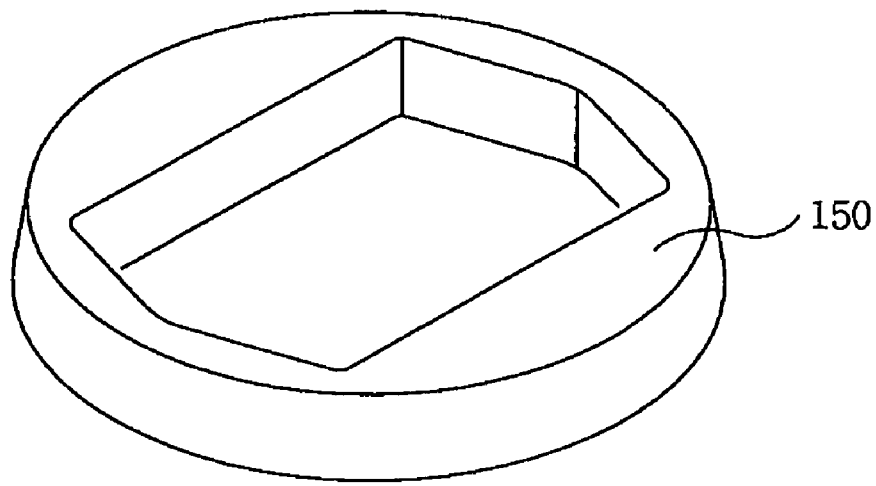
FIG. 11 is a perspective view illustrating only an upper end ring of a motor in accordance with one embodiment of the present invention.

In this case, an end ring 150 having a similar configuration to the ones in FIGS. 9 and 11 can be formed. Particularly, one can minimize the loss due to the end ring 150 by increasing the width in the d-axis direction. Since the width in the q-axis direction can also be increased, the flux barriers 140 are arranged to converge towards the center of the rotor as depicted in FIG. 9. Meanwhile, the end rings 150 arranged in the d-axis direction are in parallel with the q-axis.

In addition, end rings formed in the q-axis direction are preferably in parallel with adjacent flux barriers.

Thus, end rings 150 of this embodiment form an annular shape featuring variable radial widths along the circumferential direction of the rotor core 123. Also, the width in the q-axis direction is greater than the width in the d-axis direction.

Figure 13:
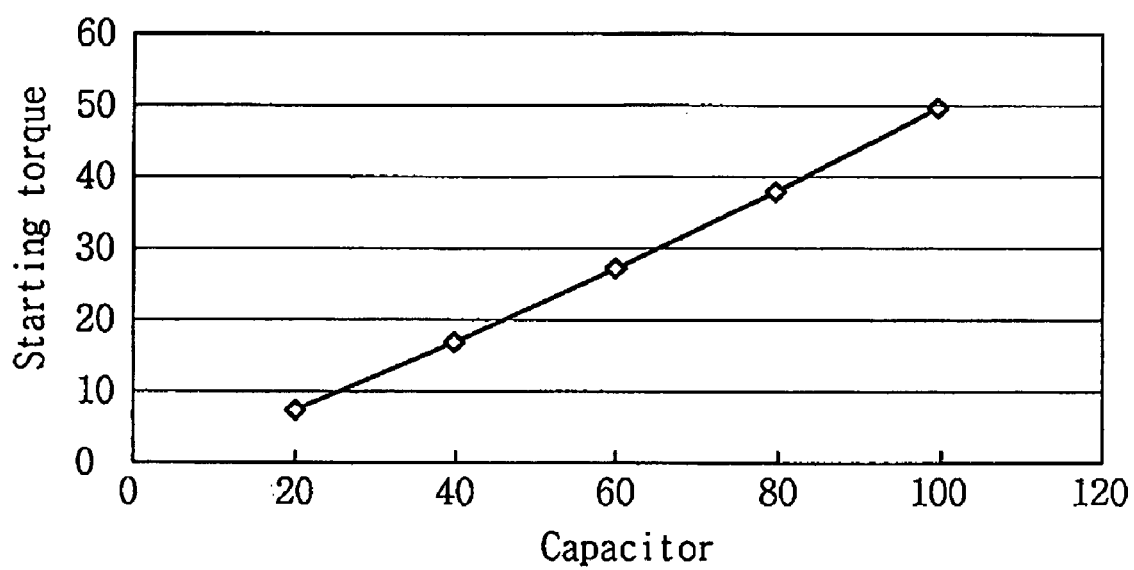
FIG. 13 is a graph illustrating the relationship between starting (or running) torque and capacitor for a motor in accordance with one embodiment of the present invention.
Figure 14:
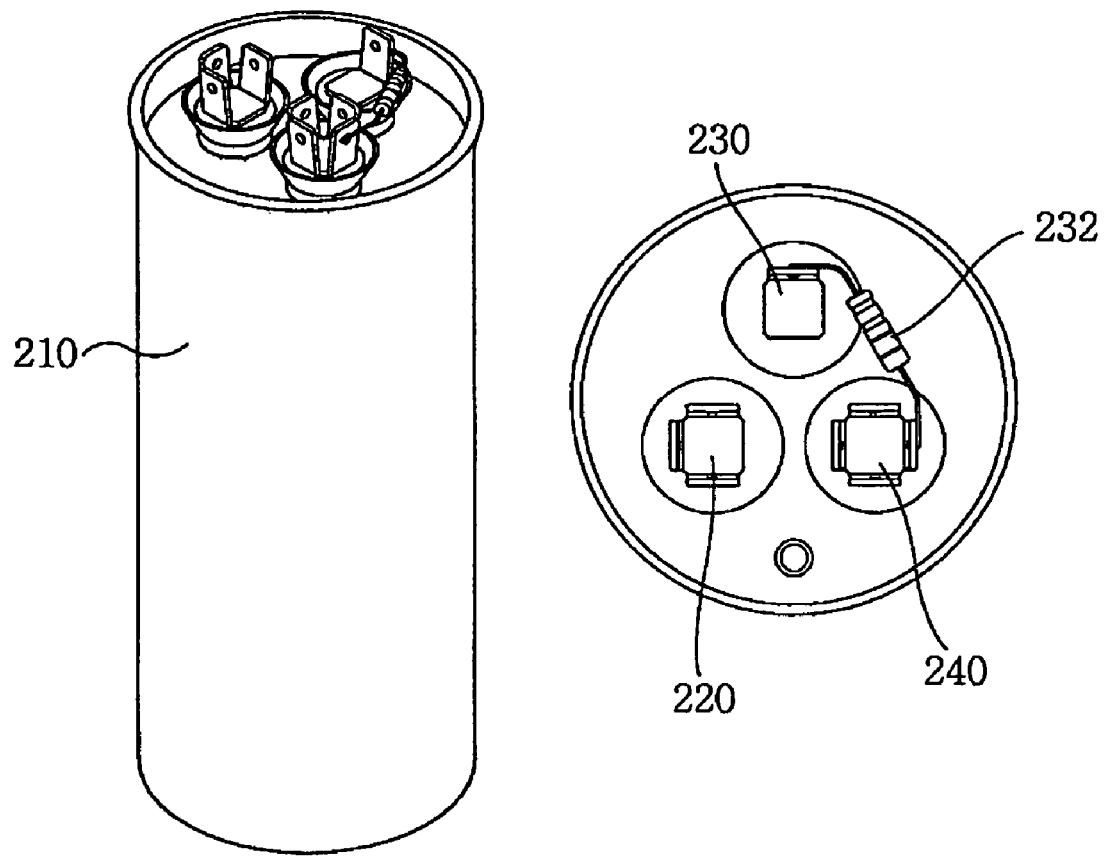
FIG. 14 illustrates one example of a capacitor included in a motor in accordance with the present invention.
Figure 15:
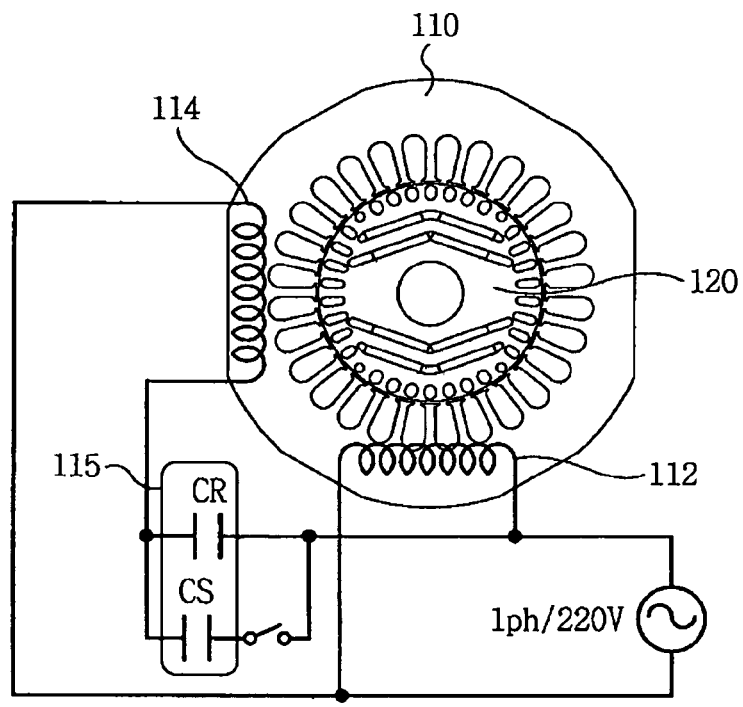
FIG. 15 briefly illustrates a circuit diagram of a stator coil and a capacitor included in a motor in accordance with the present invention.

With reference to FIGS. 13 through 15, the following will now explain in detail about the operation of a motor in accordance with the present invention.

Basically, the motor in accordance with the present invention can be applied to variable-load fan motors, compressors, home appliances, and so forth. In the interest of brevity and convenience, however, the description hereinafter will focus on the application of the motor in a rotary compressor.

In general, a single phase induction motor is often used for rotary compressors. Due to nature of the single phase induction motor as noted earlier, such a rotary compressor has the disadvantage of a low efficiency. In light of this, the motor in accordance with the present invention can be advantageously used to achieve a very high efficiency of rotary compressors or the like.

Meanwhile, a capacity modulation rotary compressor which operates at a variable capacity has recently been used widely.

As an example, there are compressors with a variable capacity depending on the amount of compressed refrigerant in one cylinder. Also, there are other compressors with a variable capacity by selectively compressing refrigerant in plural cylinders, as disclosed in Korean Patent Application Publication No. 10-2006-0120387.

In the latter case, the compressor is provided with plural cylinders, and compression of refrigerant occurs in the cylinders. Driven by one motor, refrigerants are compressed in some cylinders, while refrigerants in other cylinders are selectively compressed depending on load on the compressor.

Having a variable capacity for the compressor indicates a change in motor load for refrigerant compression. Therefore, by the use of the motor in accordance with the present invention, not the conventional induction motor, a capacity modulation compressor can demonstrate a very high-efficiency performance.

This is possible because the motor in accordance with the present invention always runs at a synchronous speed in normal operation as well as under variable load, thereby making substantial improvements in the motor efficiency in normal operation. Besides, even if the temperature of the motor may increase, since the motor runs by a reluctance torque and a magnetic torque, loss in relation to the temperature rise can be minimized.

FIG. 13 is a graph illustrating the relationship between starting torque and capacitor.

As can be seen from the graph, starting torque increases in proportion to capacitor. To make a motor start, the starting torque should have a certain value or higher. That is to say, the starting torque should be high enough to overcome an initial load of the motor. In other words, if the motor has a high initial load, the magnitude of a starting torque for a startup of the motor has to be even greater than that.

Meanwhile, a coil circuit including only one capacitor is shown in FIG. 3. In this case, the capacitor should have a value which is high enough to meet a variance in load on the motor and to start the motor under such a variable load. However, if a large-value capacitor is used despite a small load on the motor, loss occurs in the motor to that extent. Therefore, the capacitor value should vary in accordance with a variance in the motor load.

In detail, a coil includes a main wiring connected to a single phase power supply and an auxiliary wiring connected to the single phase power supply, in parallel to the main wiring. And two parallel capacitors are connected serially to the auxiliary wiring. In other words, a circuit in FIG. 15 is configured to substitute the capacitor in FIG. 3.

Here, when a switch 3 is turned on, a sum of the two capacitor values connected in parallel to each other represents the value of a capacitor. Thus, when the switch 3 is on, a large capacitor value is obtained, and a starting torque increases even more. On the contrary, when the switch 3 is off, only one capacitor value is produced, and a starting torque is relatively small.

Meanwhile, during an initial startup of a motor, in other words, during an initial startup of a compressor, one can preset the capacity for the compressor. That is, the compressor can be preset to run in high capacity or in low capacity.

Moreover, it is preferably to make the motor start quickly and enter the normal operation mode. Therefore, in order to make the initial startup quicker and obtain a good, stable startup, the switch should always be in the "ON" position during the initial startup of the motor. That is to say, the switch should remain activated all the time in the startup operation, independent of a preset capacity.

Figure 16:
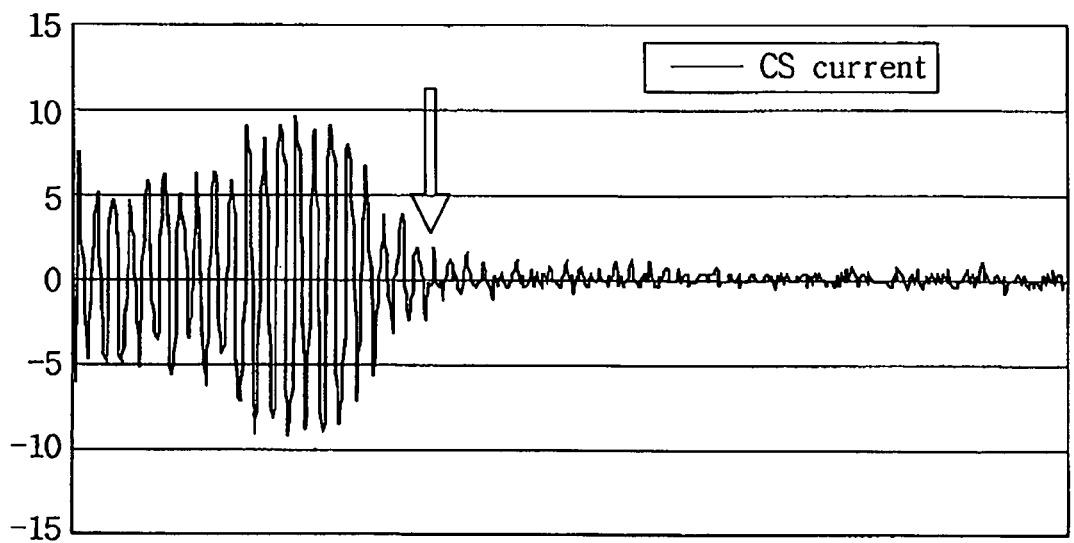
FIG. 16 graphically illustrates how a current flow in a startup capacitor of the present invention changes with respect to time.
Figure 17:
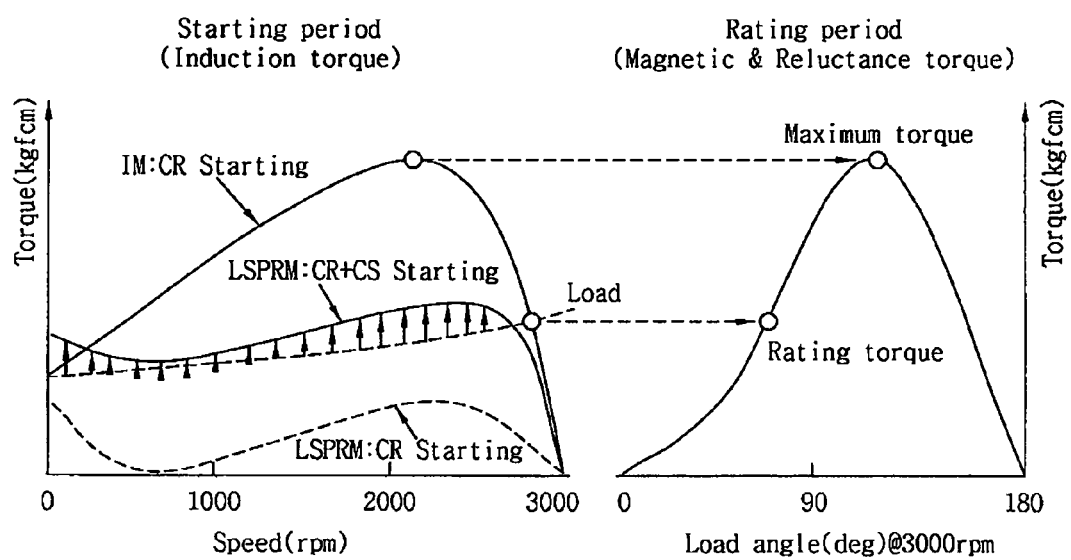
FIG. 17 is a graph comparing torque a motor in accordance with the present invention produces with torque a motor driven by a conventional capacitor produces.

FIG. 14 illustrates one example of a capacitor included in a motor in accordance with one embodiment of the present invention, FIG. 15 briefly illustrates a circuit diagram of a stator coil and a capacitor included in a motor in accordance with the present invention, FIG. 16 graphically illustrates how a current flow in a startup capacitor of the present invention changes with respect to time, and FIG. 17 is a graph comparing torque a motor in accordance with the present invention produces with torque a motor driven by a conventional capacitor produces. During the startup phase, an LSPRM motor like the motor in accordance with the present invention produces a braking torque by permanent magnets in the opposite direction of an induction torque. As a result, the induction torque may become less than a real load torque such that the startup performance is impaired, as compared with a conventional single phase induction motor. To resolve this, during the startup phase, the capacity of a capacitor being serially connected to a stator coil should be increased. However, once a motor enters the normal operation mode after the startup phase, the motor runs at a preset synchronous speed and thus, load on the motor is lessened. Therefore, if a capacitor with high capacity is used even in the normal operation mode, a power loss occurs naturally. One preferable way to avoid such a problem is using a high-capacity capacitor for the startup operation of a motor, while using a low-capacity capacitor for the normal operation.

Referring to FIG. 14, an integrated capacitor unit 115 for the motor of the present invention includes a capacitor CR for use in the normal operation mode ('normal operation capacitor') and a capacitor CS for use in the startup mode ('startup capacitor), which are installed in a casing 210. A terminal 220 of the normal operation capacitor CR, a terminal 230 of the startup capacitor CS, and a power supply terminal 240 are positioned at one side of the casing 210. A discharge resistor 232 is attached to the terminal 230 of the startup capacitor CS and dissipates electricity having been stored in the startup capacitor CS when the capacitor CS is not in use.

Referring to FIG. 15, an electrical switch is serially connected to the startup capacitor CS. When the motor gets out of the startup phase and enters the normal operation phase where the motor runs synchronously by a magnetic torque that is produced due to the permanent magnetic and a reluctance torque that is produced due to the presence of flux barriers, the electrical switch cuts off the current flow to the startup capacitor CS. Although the electrical switch may be turned on/off by a controller (not shown) that is in charge of the control over the operation of the motor, a PTC (Positive Temperature Coefficient) device is another convenient option because it can actively cut off the current flow to the startup capacitor CS without having to receive a command from the controller (not shown).

FIG. 16 graphically shows how a current flow in the startup capacitor CS changes with respect to time, given that the startup capacitor CS has been serially connected to the PCT device. As can be seen from the graph, after a certain period of time the current flow in startup capacitor CS converges almost to zero. That is, no current flow to the startup capacitor CS after a certain period of time, and current flows only to the normal operation capacitor CR such that the total capacity of capacitors becomes lower. As such, one can control the capacity of capacitor(s) suitably for the line start permanent magnet reluctance motor to which a smaller load is applied during the normal operation mode than in the startup mode.

Referring to FIG. 17, the sum of the capacity of the normal operation capacitor CR and the capacity of the startup capacitor CS should be sufficiently large for the induction torque of the motor to be greater than at least load torque. The motor torque during startup increases in proportion to the capacity of capacitor(s). According to the graph in FIG. 17, instead of the both the normal operation capacitor CR and the startup capacitor CS together, if the normal operation capacitor CR is used alone to start a motor, the motor can only generate a smaller induction torque than the load. This is why in the present invention motor the startup capacitor CS is connected in parallel with the normal operation capacitor CR. In so doing, the capacity of capacitors increases and a greater starting torque is induced. When the speed of motor reach the synchronous speed, the motor is driven by a magnetic torque produced due to the permanent magnetic and by a reluctance torque produced due to the presence of flux barriers. As shown in FIG. 17, the maximum torque produced by the motor in accordance with the present invention is equivalent to the maximum torque produced by any of conventional induction motors.

Figure 18:
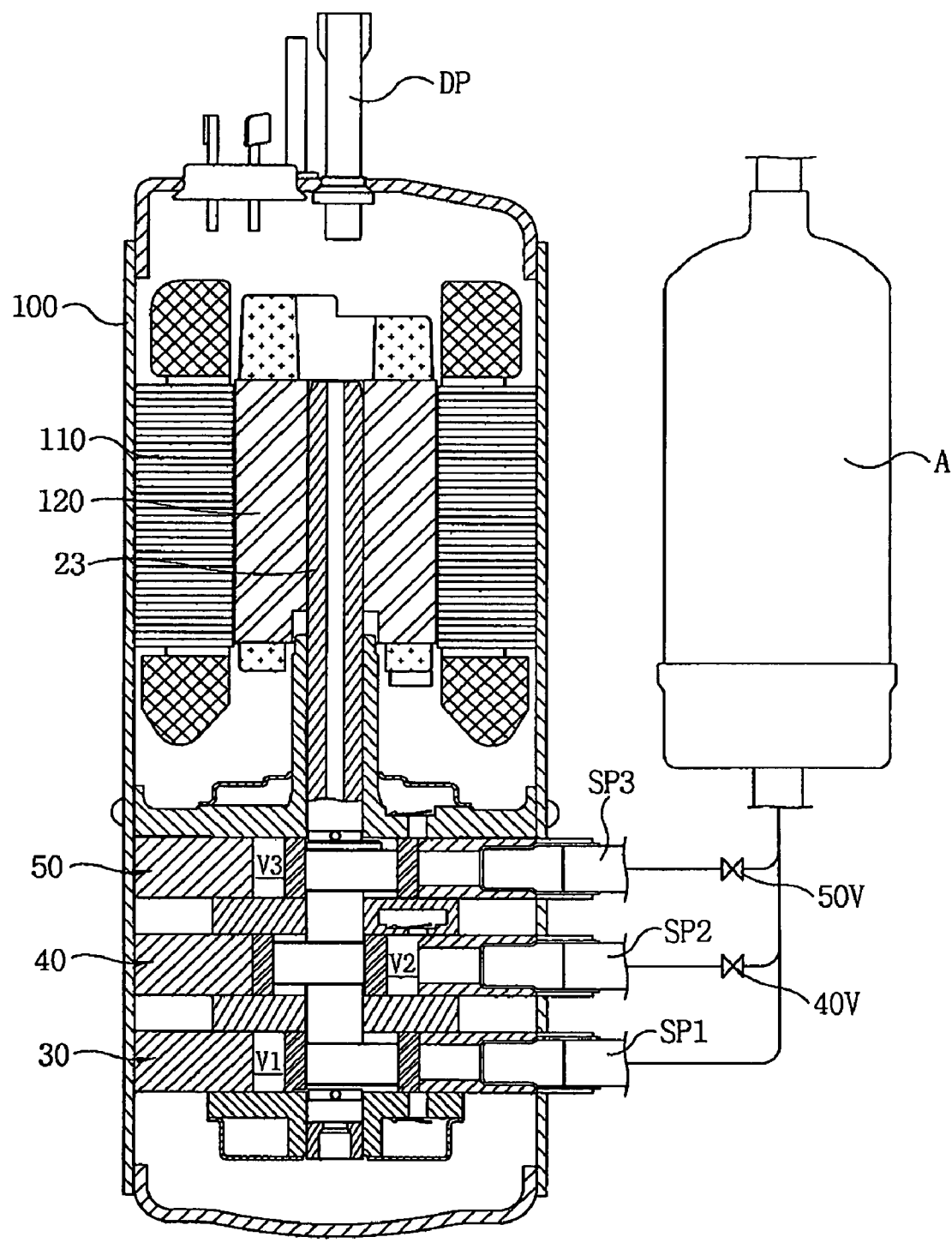
FIG. 18 illustrates a compression mechanism in accordance with a first embodiment of the present invention.

FIG. 18 illustrates a compressor in accordance with a first embodiment of the present invention. In particular, a capacity modulation rotary compressor is illustrated as an example, which the compressor includes a casing 100 defining hermetic space S; a motor used as a driving unit that is fixed inside the casing 100 and includes a stator and a rotor (to be described); a plurality of compressor units, including a first compressor unit 30, a second compressor unit and a third compressor unit 50, installed inside the casing 100 and connected to the motor to compress a refrigerant; an accumulator A where a working fluid having passed through an evaporator of the refrigeration cycle is separated into liquid and vapor components; suction pipes 30s, 40s, and 50s, via which the working fluid is sucked into the compressor units 30, 40, and 50, respectively, from the accumulator A; and suction valves 40v and 50v mounted on the suction pipes 40s and 50s, for opening/closing the suction pipes 40s and 50s so as to regulate the suction flow of the working fluid into the compressor units 40 and 50. The motor includes a stator 110 fixed inside the casing 100, for receiving electric power from outside; a rotor 120 arranged inside the stator with a predetermined gap there between to rotate engagedly with the stator 110; and a shaft 23 integrally formed with the rotor 120, for transferring a drive force to the compressor units 30, 40 and 50.

To see how the capacity modulation compressor works, when power is applied to the stator 110 included in the motor and the rotor 120 starts rotating, the shaft 23 also rotates engagedly with the rotor 120 and transfers the torque of the motor to the first through third compressor units 30, 40 and 50, such that the compressor produces either a large cooling capacity while operating in a high power mode, or a small cooling capacity while operating in a power saving mode, under proper regulations of the suction valves 40v and 50v complying with a required capacity by an air conditioning system.

The following will now explain the operating method of a capacity modulation compressor in accordance with one embodiment of the present invention. The capacity modulation compressor of the present invention includes a plurality of compressor units 30, 40 and 50, and a motor functioning as an electromotive driving unit for driving the compressor units 30, 40 and 50. As noted earlier, a line start permanent magnet reluctance motor is utilized as the electromotive driving unit 20. In other words, during the startup of such a capacity modulation compressor, the motor starts running by an induction torque that is produced by conductive bars 122 of the rotor 120, but, in the normal operation, it is driven by a reluctance torque produced due to the presence of flux barriers 140 and a magnetic torque produced due to the permanent magnets 130 and operates at a synchronous speed in synchronous with a given power frequency. Thus, it becomes possible to lower power loss occurring in the conductive bars 122 of the rotor 120. Meanwhile, during the startup operation, the magnetic torque that is produced due to the presence of the permanent magnets 130 works in the opposite direction to the induction torque that is produced due to the presence of the conductive bars 122, functioning as a braking torque or a load.

Unlike a single phase induction motor which is a type of asynchronous motor, the line start permanent magnet reluctance motor is a type of synchronous motor, so an induction torque equal to or only slightly higher than a load torque is sufficient to cause the motor to run at a speed close to the preset synchronous speed. Even if the controller (not shown) might have started the capacity modulation compressor in accordance with the present invention under low load and thus only a relatively low induction torque was produced in the conductive bars 122 of the rotor 120, the capacity modulation compressor of the present invention can still demonstrate an enhanced power efficiency because an induction torque not lower than a load torque is already secured.

Here, the controller (not shown) makes the capacity modulation compressor start to rotate under conditions of lower load than the maximum load condition. In the case of the capacity modulation compressor in accordance with one embodiment of the present invention as depicted in FIG. 18, if the compressor is started, under the control of the controller (not shown) with all of the suction valves 40v and 50v being closed, a working fluid is compressed only in the first compressor unit 30 so that a minimum load is applied to the motor. On the other hand, if the capacity modulation compressor is started with only one of the suction valves 40v and 50v being closed, a working fluid is compressed in the first compressor unit 30 and in one of the second and third compressor units 40 and 50, so a load still lower than a maximum load is applied to the motor.

Although the first, second and third compressor units 30, 40 and 50 may have the same amount of compressing capacity, i.e., placing the same load on the electromotive driving unit 20, if they have different capacities, the compressed capacities of the compressor units 30, 40 and 50 can be in more diverse combinations. Therefore, it is better to let them have different capacities.

Figure 19:
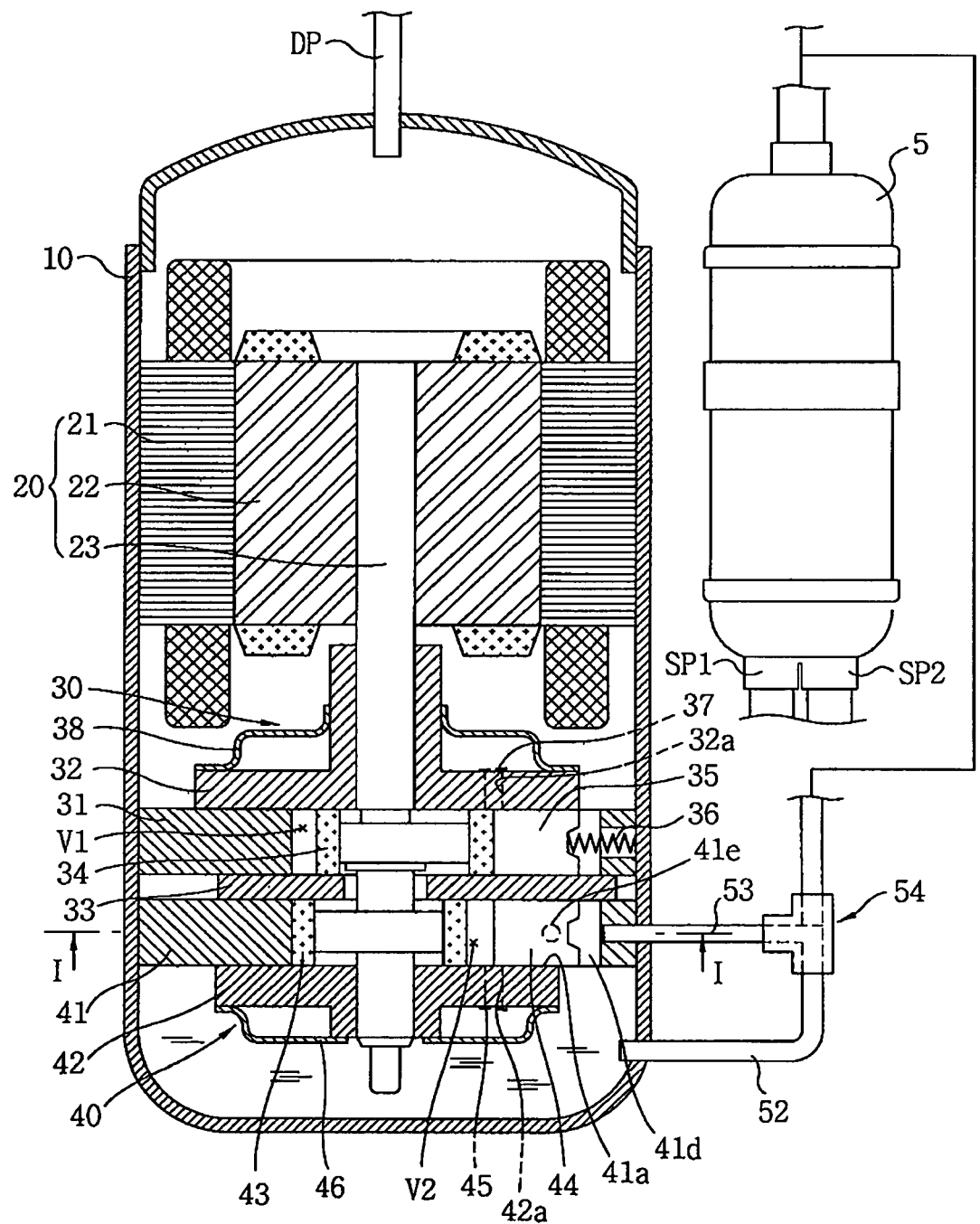
FIG. 19 illustrates a compression mechanism in accordance with a second embodiment of the present invention.

FIG. 19 illustrates a compressor in accordance with a second embodiment of the present invention. The compressor of this embodiment includes: a casing 100 where plural gas suction pipes SP1 and SP2 and a gas discharge pipe DP are housed, communicating with each other; a motor 20 installed at the upper side of the casing 100, for generating a torque; a first and a second compressor unit 30 and 40 installed at the lower side of the casing 100, for compressing a refrigerant with the motor-generated torque; and a vane control unit 50 connected to the intermediate section between the plural suction pipes SP1 and SP2 and the discharge pipe DP, for switching a rear face of a second vane 44 (to be described) from high pressure atmosphere to low pressure atmosphere, for supporting the second vane 44 as well as supplying a high pressure to a lateral face of the second vane, so as to selectively control the second vane 44 based on a difference between the pressure applied to the rear face of the second vane 44 and the pressure applied to the lateral face of the second vane 44.

The motor 20 includes a stator 21 and a rotor 22, and its detailed structure can be referred back to the discussions in conjunction with FIG. 3 through FIG. 17.

The first compressor unit 30 is constituted by a first annular cylinder 31 installed inside the casing 10; an upper bearing plate (hereinafter, an upper bearing) 32 and an intermediate bearing plate (hereinafter, an intermediate bearing) 33 for covering both upper and lower side of the first cylinder 31 to form a first compression space V1 together and for supporting the shaft 23 in a radius direction; a first rolling piston 34 rotatably connected to an upper side eccentric portion of the shaft 23, for compressing a refrigerant while rolling in the first compression space V1 of the first cylinder 31; a first vane 35 movably connected to the first cylinder 31 in a radius direction to be contacted with an outer peripheral surface of the first rolling piston 34, for partitioning off the first compression space V1 of the first cylinder 31 into a first suction chamber and a first compression chamber; a first vane spring 36 taking the form of a compression spring to resiliently support the rear side of the first vane 35; a first discharge valve 37 openably connected to an end of a first discharge port 32a, for regulating discharge of refrigerant vapor coming out of the first compression chamber in the first compression space V1; and a first muffler 38 provided with a predetermined interior spatial volume to receive the first discharge valve 37 and connected to the upper bearing 32.

The second compressor unit 40 is constituted by a second annular cylinder 41 installed underneath the first cylinder 31 housed in the casing 10; an intermediate bearing 33 and a lower bearing 42 for covering both upper and lower side of the second cylinder 41 to form a second compression space V2 together and for supporting the shaft 23 in both radial and axial directions; a second rolling piston 43 rotatably connected to a lower side eccentric portion of the shaft 23, for compressing a refrigerant while rolling in the second compression space V2 of the second cylinder 31; a second vane 44 movably connected to the second cylinder 41 in a radius direction to be contacted with or separated from an outer peripheral surface of the second rolling piston 43, for partitioning off the second compression space V2 of the second cylinder 41 into a second suction chamber and a second compression chamber both being able to communicate with each other; a second discharge valve 45 openably connected to an end of a second discharge port 42a that is formed near the center of the lower bearing 42, for regulating discharge of refrigerant vapor coming out of the second compression chamber; and a second muffler 46 provided with a predetermined interior spatial volume to receive the second discharge valve 45 and connected to the lower bearing 42.

The second cylinder 41 includes a second vane slit 41a which is formed at a portion on the inner peripheral surface defining the second compression space V2, for allowing the second vane 44 to reciprocate in a radius direction along with it; a second suction port 41b extending in a radiation direction, which is formed at one side of the second vane slit 41a, for guiding a refrigerant to the second compression space V2; and a second discharge guide groove 41c extending in an axial direction at a tilt angle, which is formed at the other side of the second vane slit 41a in an axial direction, for discharging a refrigerant into the casing 10. Moreover, a back pressure space 41d having a predetermined interior spatial volume is formed on the rear radial side of the second vane slit 41a, so as to create a suction- or discharge-pressure atmosphere behind the second vane 44 through the communication with a back pressure connection pipe 53 of the vain control unit 50. Further, a lateral pressure passage 41e is formed in a direction orthogonal to the movement direction of the second vane 44, or at a predetermined stagger angle, so as to control the second vane 44 with a discharge pressure by letting the second vane slit 41a communicate with the interior of the casing 10.

The back pressure space 41d is given a predetermined interior spatial volume that, although the second vane 44 may have fully retreated and inserted into the second vane slit 41a via the common connection pipe 53 (to be detailed) of the vane control unit 50, the rear face of the second vane 44 forms a pressure side for an input pressure that is transferred via the common connection pipe 53.

The lateral pressure passage 41e is formed on the discharge guide groove 41c side of the second cylinder 41 with respect to the second vane 44. Preferably, a plurality of lateral pressure passages (on both upper and lower ends as shown in the drawing) are formed in the height direction of the second vane 44. In addition, the total cross-section area of the lateral pressure passage 41e should be equal to or smaller than area of a pressure side applying pressure to the rear face of the second vane 44 through the back pressure space 41d, such that the second vane 44 may not be controlled extremely. If necessary, the second cylinder 41 can be designed to occupy the same volume with or a different volume from the first cylinder 31 in the first compression space V1. In the former case where the two cylinders 31 and 41 have the same volume with each other, the compressor capacity can be cut down to half (50%) because only one of the cylinders will work if the other cylinder works in power saving mode. In the latter case where the two cylinders 31 and 41 have different volumes, the compressor capacity varies as much as volume ratio of the other cylinder in normal operation mode.

The vane control unit 50 comprises a low pressure side connection pipe 51 communicating with the suction side of the second cylinder 41; a high pressure side connection pipe 52 communicating with the discharge side of the second cylinder, or with the interior space of the casing 10 to be more accurate; a common connection pipe 53 connected alternately to both the low pressure side connection pipe 51 and the high pressure side connection pipe 52, so as to communicate with the back pressure space 41d of the second cylinder 41; a three-way valve 54 functioning as a back pressure switch valve, which is installed at a junction of the low pressure side connection pipe 51, the high pressure side connection pipe 52, and the common connection pipe 53 to alternately connect the common connection pipe 53 to the other two connection pipes 51 and 52; and a lateral pressure supply unit provided to the second cylinder 41, for supplying a discharge pressure to the lateral face of the second vane 44 so that the second vane 44 is closely adhered to the second vane slit 41a of the second cylinder 41.

The low pressure side connection pipe 51 is connected between the suction side of the second cylinder 41 and a gas suction pipe on the inlet side of the accumulator 5/a gas suction pipe (the second gas suction pipe) SP2 on the outlet side of the accumulator 5.

The high pressure side connection pipe 52 may be designed to communicate with the lower part of the casing 10, such that oil (fluid) is introduced directly into the back pressure space 41*d* from the casing 10, but it may also be branched in the center of the gas discharge pipe DP. As the back pressure space 41*d* is sealed in this case, oil might not be supplied between the second vane 44 and the second vane 44 and the second vane slit 41*a*, so frictional loss is likely to occur. To overcome the frictional loss, therefore, an oil feed hole (not shown) may be formed at the lower bearing 42 to enable oil to be fed when the second vane 44 reciprocates.

As described above, for the lateral pressure supply unit, there is at least one lateral pressure passage 41*e* (e.g., two passages in the both upper and lower sides as in the drawing) formed in the second cylinder 41, so as to facilitate the transfer of discharge pressure from casing 10 in the thickness direction of the second vane 22. However, it is more desirable to form the lateral pressure passages in the discharge guide groove 41*c* side with respect to the second vane 44 and to make all of the passages have a uniform cross-section area in the height direction of the vane.

Although a capacity modulation compressor has mainly been explained as an example of rotary compressor, one should notice that sealed type compressors or scroll compressors can also employ a line start permanent magnet reluctance motor as their power transmission unit.

Figure 20:
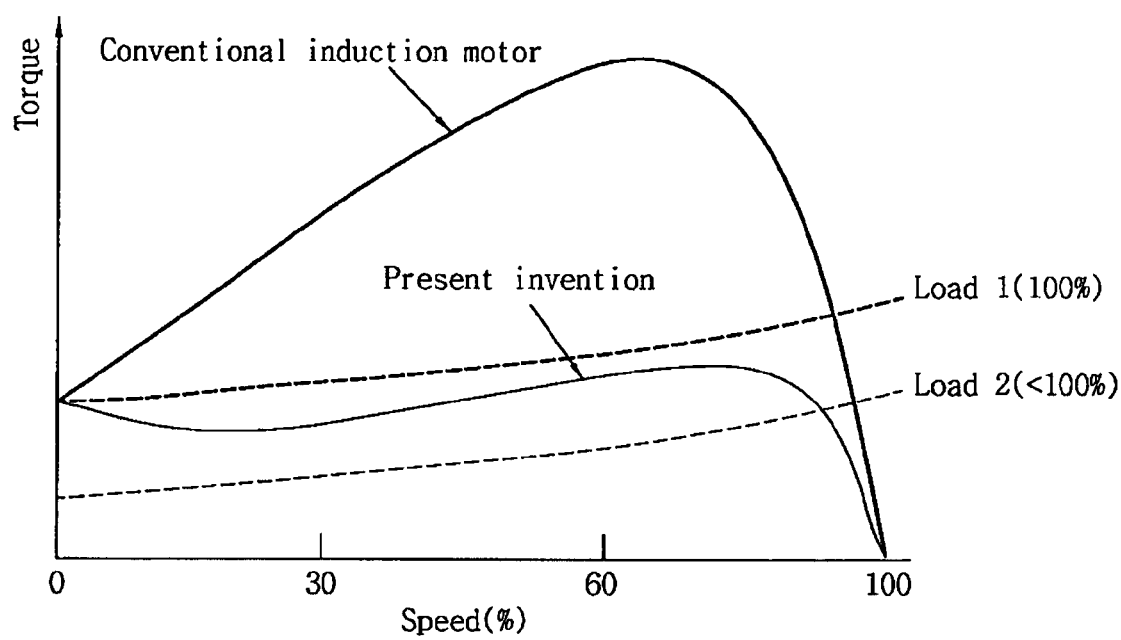
FIG. 20 is a graph comparing a starting torque produced by a motor included in a compression mechanism in accordance with the present invention with a starting torque produced by a conventional induction motor.

The following will now explain about a startup operation for the compressor in accordance with the first or second embodiment of the present invention as illustrated in FIG. 18 or FIG. 19. FIG. 20 is a graph comparing a starting torque produced by a motor included in a compression mechanism in accordance with the present invention with a starting torque produced by a conventional induction motor.

As evident in the graph of FIG. 20, the starting torque of an electromotive driving unit is considerably less than the starting torque of a conventional induction motor. However, when a line start permanent magnet reluctance motor is concerned, it is only required to generate an induction torque greater than a load torque, assuming that the motor is operating at a preset synchronous speed or lower. Here, load being applied to the electromotive driving unit when the compressor unit of a capacity modulation compressor compresses a working fluid varies depending on compressing capacity of the compressor unit of interest. That is, if a compressor unit compresses a working fluid (e.g., refrigerant, refrigerant oil, etc) with a lower capacity, a smaller load is placed on the electromotive driving unit. As in the graph, a load (Load 1) assigned to the electromotive driving unit when a compressor unit having the maximum capacity (100%) compresses a working fluid is smaller than a load (Load 2) assigned when a compressor unit having a capacity less than the maximum value (<100%) compresses a working fluid (<100%). Also as mentioned above, a large starting torque of an electromotive driving unit included in the capacity modulation compressor of the present invention is not always desirable, because the starting torque of the electromotive driving unit is only required to have a slightly higher value than the load torque. Therefore, power efficiency of a compressor can be improved markedly by keeping the load torque to a minimum and by maintaining the starting torque at a value only slightly higher than the minimum load torque.

Under such configuration, the compression mechanism of the present invention can be driven in power saving mode where only some of the compressor units 30, 40 and 50 (refer to FIGS. 18 and 19) for the compression mechanism are involved in the compression of a working fluid required for a startup. As a result, a smaller load is put on the motor of the compressor, so that the startup operation can easily be performed even by a relatively low starting torque.

As the load assigned to the electromotive driving unit can be reduced by regulating the compressing capacity of a compressor unit, one can improve startup properties of a compressor driven by a line start permanent magnet reluctance motor that functions as the electromotive driving unit running not only on single-phase power, but also on two-phase or three-phase power.

Figure 21:
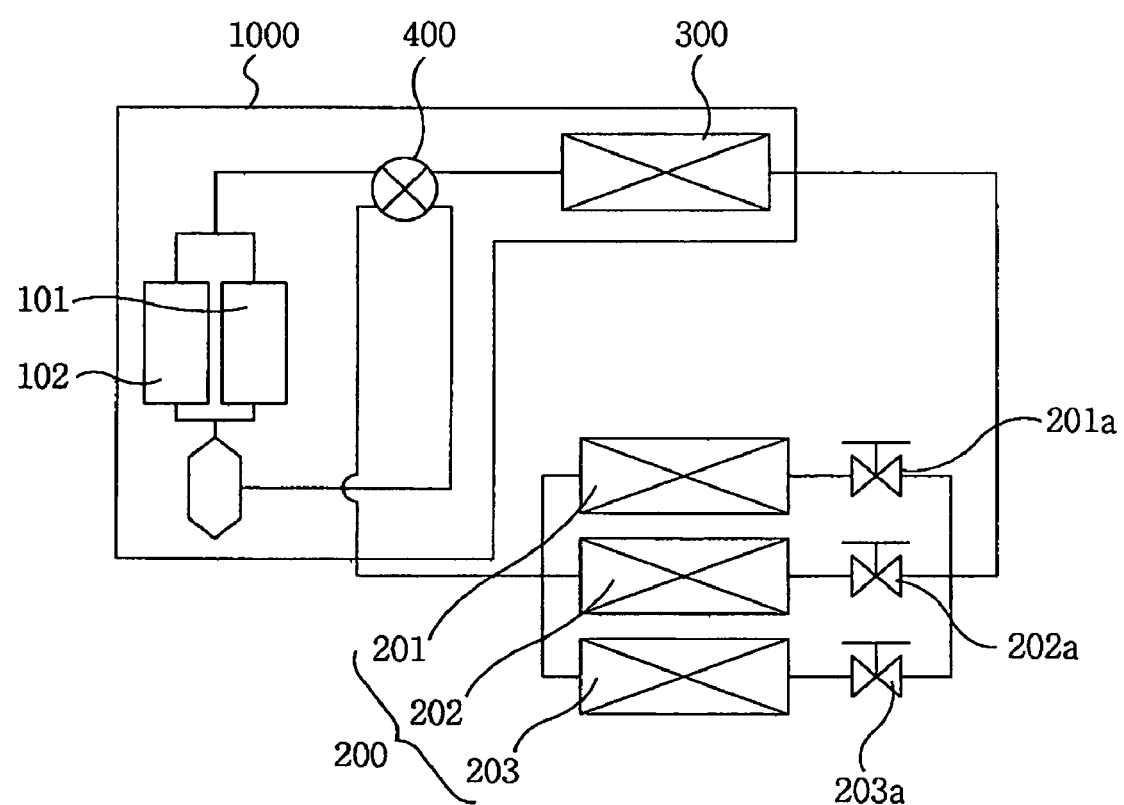
FIG. 21 illustrates an air conditioning system in accordance with one embodiment of the present invention.

FIG. 21 illustrates an air conditioning system in accordance with one embodiment of the present invention. In particular, the air conditioning system of the present invention can be advantageously used in a broad space or in areas either too cold or too hot where speedy operations to provide a pleasant indoor climate within a proper temperature range is very much appreciated, by connecting a plurality of indoor units 201, 202, and 203 to one outdoor unit 1000 including compressors 101 and 102 and a condenser 300. For the air conditioning system to operate in combined cooling and heating mode, the outdoor unit 1000 should be equipped with a four-way valve 400 for controlling the direction of fluid flow.

The plurality of indoor units 200 are selectively operated in response to user manipulation. In this manner, capacity of the compressors that is actually required of the indoor unit 200 varies depending on each case. If the outdoor unit 1000 is provided with only one constant speed compressor designed to have a maximum capacity, a waste of energy will always remain as a problem because the compressor has excess capacity in case the indoor unit 200 is driven at lower capacity than a maximum. Meanwhile, if the outdoor unit 100 is equipped with a capacity modulation compressor driven by an inverter motor, one can modulate the compressing capacity to comply with cooling capacity requirement of the indoor unit 200, but the use of such an expensive component like the inverter driver only lowers price competitiveness. Besides, because the driver itself consumes electricity, power efficiency of the system will also suffer a loss to a certain degree.

To resolve these problems, the air conditioning system in accordance with the present invention is provided with an indoor unit 200 including plural compressors connected to each other serially and/or in parallel. At least one of the plural compressors is a capacity modulation compressor similar to the one described with reference to FIG. 18 or FIG. 19, and a line start permanent magnet reluctance motor is employed as an electromotive driving unit for the capacity modulation compressor.

Thus, one embodiment of the air conditioning system of the present invention includes plural indoor units 200 accommodated in a broad space together or in a plurality of defined spaces separately. By selectively operating the indoor units 201, 202, 203, cooling and heating operations can be done only in predetermined or selected spaces.

The indoor units 201, 202, and 203 are connected to each other in parallel, and there is a controller (not shown) for controlling each of the indoor units and the outdoor unit 1000. A user can select indoor unit(s) to be operated and a load (cooling capacity) of the selected indoor unit(s) 201, 202, and 203. In response to user inputs regarding the indoor unit(s) to be operated and the load (cooling capacity) of the selected indoor unit(s) 201, 202, and 203, the controller (not shown) controls the compressing capacity of the compression mechanism included in the outdoor unit 1000.

For example, suppose that the outdoor unit 1000 is provided with two compressors 101 and 102. Examples of possible configuration that can come out of this condition are using two capacity modulation compressors, using one capacity modulation compressor and one fixed-capacity compressor in combination, and using one capacity modulation compressor and one inverter compressor in combination. Likewise, suppose that the outdoor unit 1000 is provided with three compressors. In this case, two fixed capacity compressors and one capacity modulation compressor can be used in combination, or one capacity modulation compressor and two fixed-capacity compressors can be used in combination.

In the case of using one capacity modulation compressor and one fixed-capacity, fixed-speed compressor, the fixed-capacity compressor may have a refrigerant compressing capacity greater or less than the maximum capacity of the capacity modulation compressor.

Figure 22:
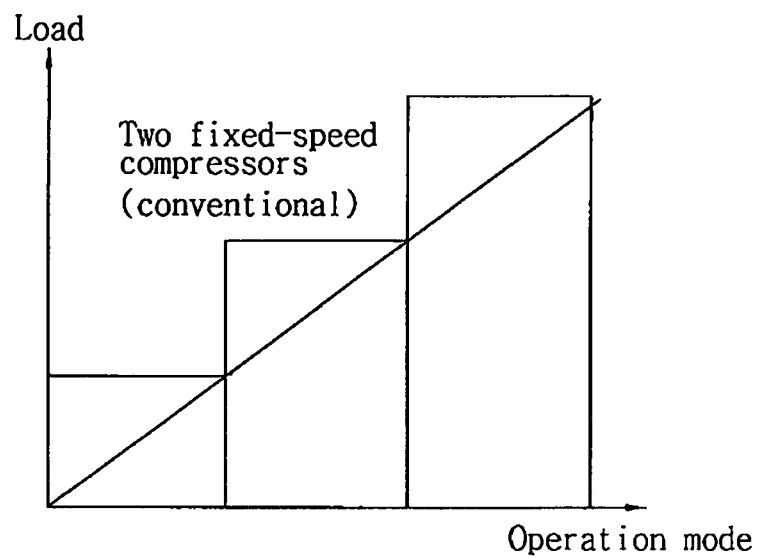
FIG. 22 is a graph illustrating compressive load on an outdoor unit including two fixed-capacity, fixed-speed compressors in a prior art.
Figure 23:
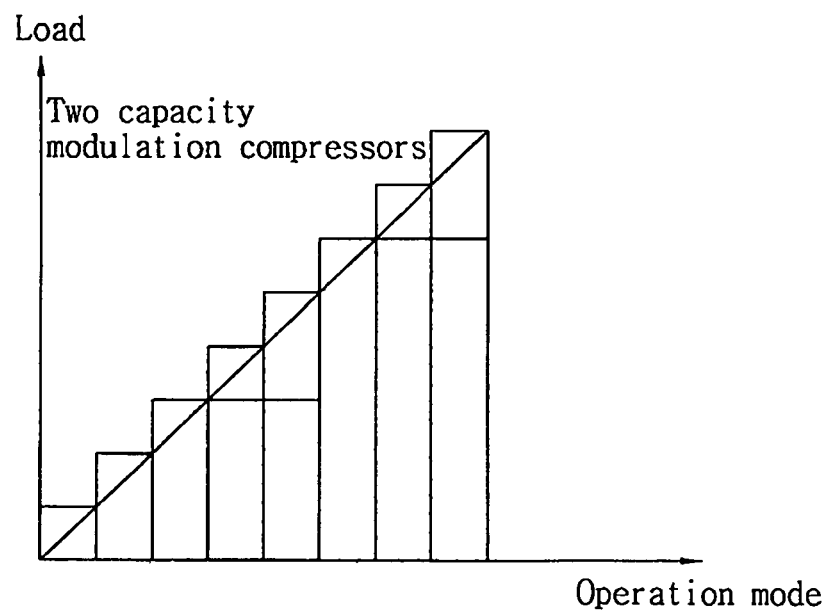
FIG. 23 is a graph illustrating compressive load on an outdoor unit including one capacity modulation compressor in accordance with one embodiment of the present invention and one fixed-capacity, fixed-speed compressor.
Figure 24:
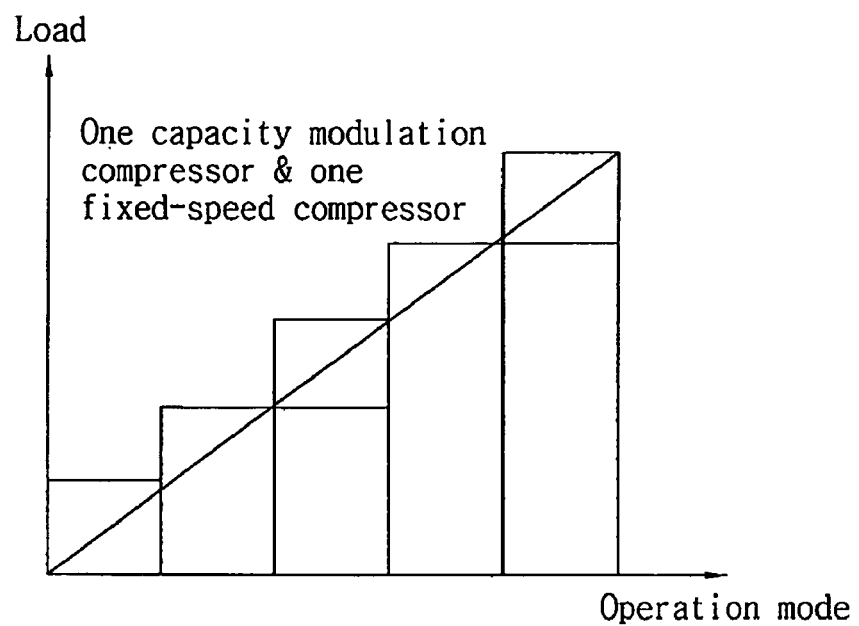
FIG. 24 is a graph illustrating compressive load on an outdoor unit including two capacity modulation compressors in accordance with one embodiment of the present invention.
Figure 25:
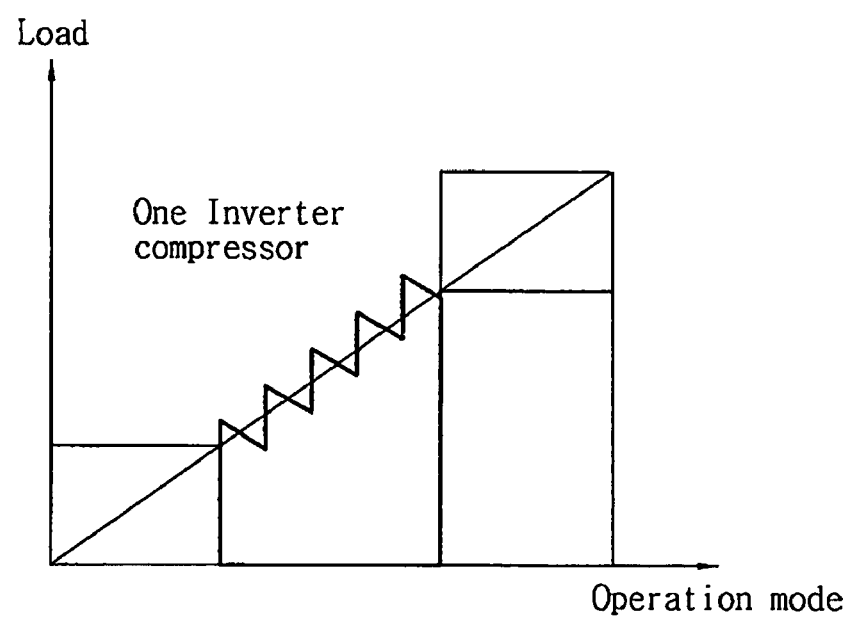
FIG. 25 is a graph illustrating the load on an outdoor unit including one capacity modulation compressor in accordance with one embodiment of the present invention and one inverter compressor.

FIG. 22 is a graph illustrating compressive load on an outdoor unit including two fixed-capacity, fixed-speed compressors in a prior art, FIG. 23 is a graph illustrating compressive load of an outdoor unit including one capacity modulation compressor in accordance with one embodiment of the present invention and one fixed-capacity, fixed-speed compressor, FIG. 24 is a graph illustrating compressive load of an outdoor unit including two capacity modulation compressors in accordance with one embodiment of the present invention, and FIG. 25 is a graph illustrating the load on outdoor unit including one capacity modulation compressor in accordance with one embodiment of the present invention and one inverter compressor.

Referring to the graph in FIG. 22, the compressive load on the outdoor unit provided with two conventional fixed capacity and speed compressors can be modulated only in three steps. For example, suppose that two fixed capacity and speed compressors of different capacities are used for an outdoor unit. Then, the compressive load on the outdoor can be adjusted only in three steps: (i) compressing capacity modulation for a low-capacity compressor; (ii) compressing capacity modulation for a high-capacity compressor; and (iii) compressing capacity modulation for the both low- and high-capacity compressors. Considering that an outdoor unit may be provided with a larger number of indoor units, the above-described scheme may not be much efficient to comply with diverse changes in cooling capacity that are to be modulated through more than three steps.

On the contrary, graphs in FIGS. 22 through 25 illustrate that the compressive load on the outdoor unit of the present invention can be modulated in multiple steps. This suggests that the compressive load on an outdoor unit used for a multi-air conditioning system provided with plural indoor units connected to the outdoor unit can be adjusted in response to a change in the required load of the indoor units through several steps.

Figure 26:
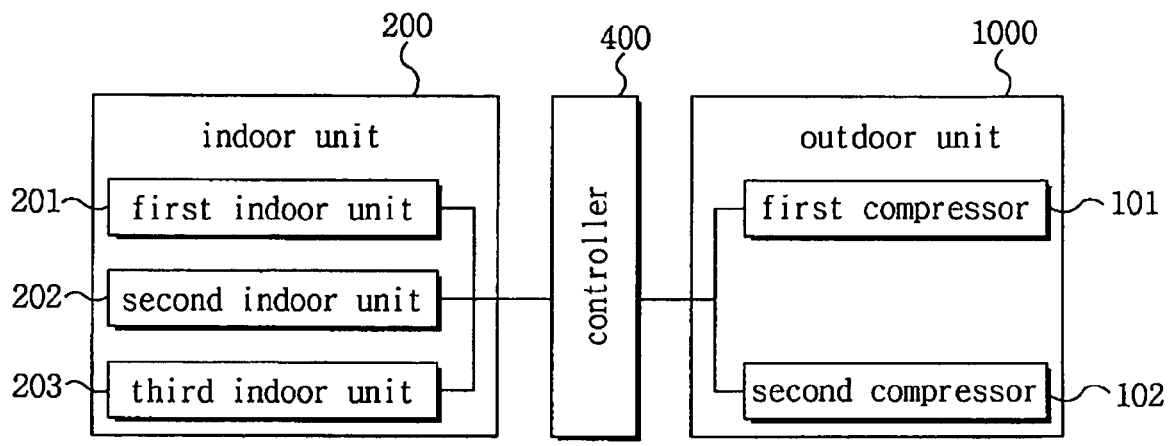
FIG. 26 is a diagram of the one embodiment of the air conditioning system having a controller, in accordance with the present invention.

FIG. 26 is a diagram of the one embodiment of the air conditioning system having a controller, in accordance with the present invention.

Figure 27:
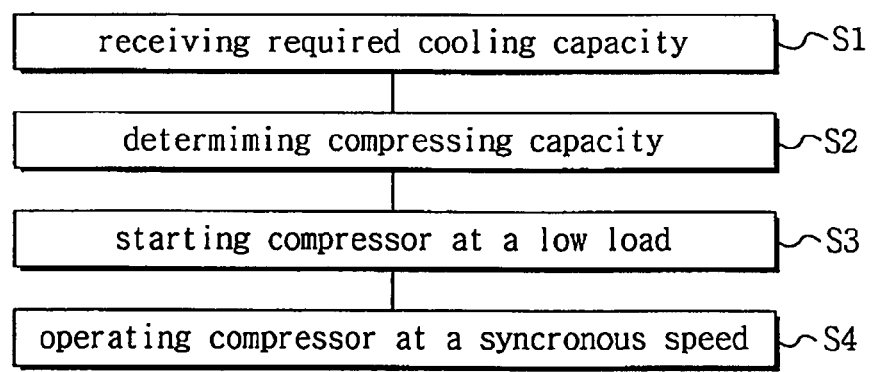
FIG. 27 is a flowchart illustrating the method for controlling the air conditioning system in accordance with the present invention.

FIG. 27 is a flowchart illustrating the method for controlling the air conditioning system in accordance with the present invention.

The controller 400 of the air conditioning system receives on/off signals from each of a plurality of indoor units 201, 202, 203 and receives an input data on a required cooling capacity for each, respectively (S1). For example, the controller 400 receives the signal that the first indoor unit 201 is off, the second indoor unit 202 and the third indoor unit 203 are on and the data on a required cooling capacity of the second indoor unit 202 and the third indoor unit, respectively.

The whole compressing capacity of a plurality of the compressor 101 and 102 provided in the outdoor unit 1000 is same as the whole required cooling capacity or more. For example, suppose that the required cooling capacity of each indoor unit 201, 202, 203 is 100 so the total required cooling capacity is 300, the compressing capacity of the outdoor unit 1000 should be 300 or slightly more. Further if the outdoor unit 1000 has a first compressor 101 and a second compressor 102, the first compressor and second compressor can have their compressing capacity as 150 for each, the first compressor 100, the second compressor 200, and so on.

Preferably, at least one of the compressors of the outdoor unit 1000 is a capacity modulation compressor figured in FIG. 18 or FIG. 19. In a following description, the first compressor 101 is depicted as a capacity modulation compressor. The first compressor 101 has a plurality of compressor units and each compressor unit can have identical compressing capacity or different capacity. As shown in FIG. 19, in the case of the capacity modulation compressor has two compressor units, if the first compressor unit has its compressing capacity of 50, the second compressor unit has its compressing capacity of 100, the compressing capacity of the modulation compressor can be varied in three steps of 50, 100, and 150. The second compressor 102 can be a capacity modulation compressor like the first compressor 101 as well as a fixed capacity/fixed speed compressor but here, the second compressor 102 is depict as a fixed capacity/fixed speed compressor. If the second compressor has its compressing capacity of 150, the compressing capacity of the outdoor unit 1000 can be varied in six steps of 50, 100, 150, 200, 250, and 300.

If the total required cooling capacity of the plurality of the indoor units 201, 202, 203 is 150 or less, only the first compressor is used for compressing the refrigerant and one can save the energy through preventing the outdoor unit 1000 from compressing excessive capacity of the working fluid. Further, if the total required cooling capacity is over 150, the first and second compressor 101, 102 are operated together, and the compressing capacity of the indoor unit 1000 should be slightly more than the total required cooling capacity of the first, second and third indoor unit 201, 202, 203, by combination of the first and the second compressor.

In S1, if the controller 400 receives the signals that the first indoor unit is off, the second unit is on and requires cooling capacity of 50, and the third unit is on and requires cooling capacity of 100, then the controller determines the operation of the first compressor 101 and the compressing capacity of the first compressor as 150 (S2).

Here, under the general operation of the air conditioning system the first compressor 101 which is a capacity modulation compressor is always operated. As described above, a line start permanent magnet reluctance motor (LSPRM) has a tendency that it has larger load assigned in startup than in normal operation because of the braking torque of the permanent magnetic added to the load assigned to the motor. Therefore the capacity modulation compressor should be operated with lower compressing capacity regardless of the total required cooling capacity of indoor units 200. That is, the capacity modulation compressor does not start with the compressing capacity of 150 (the largest compressing capacity), but with the compressing capacity of 50 or 100. To compensate the braking torque in startup, the load assigned by the compressor unit should be made lower and there is no need to make the capacity of the capacitor larger. As explained above, the capacity of the capacitor of line start permanent magnet reluctance motor (LSPRM) is proportional to the starting torque of the capacitor of line start permanent magnet reluctance motor (LSPRM). If the motor starts by making the starting larger than the load torque, the capacitor having large capacity is needed, and it can be power loss in the normal operation.

Therefore, the first compressor 101 starts to rotate with the compressing capacity of 50 or 100 regardless of the determined compressing capacity in S2 (S3). Then after, the first compressor 101 enters in synchronous operation, the first compressor is operated with the capacity determined in S2, that is 150.

Here, the example of the operation method shows that only the first compressor is operated, but the indoor unit 200 required more cooling capacity the first and second compressor 101, 102 can be operated at the same time. Further In the case of that both the first compressor 101 and the second compressor 102 can be line start permanent magnet reluctance motors, the first compressor 101 and the second compressor start to rotate with lower load. Also, in the case of any air conditioning system that has at least one indoor unit and the indoor unit including at least one compressor, and wherein the compressor includes the line start permanent magnet reluctance motor, the method for controlling the air conditioning system can be applied.

While the present invention has been described with respect to the specific embodiments, it will be apparent to those skilled in the art that various changes and modifications may be made without departing from the spirit and scope of the invention as defined in the following claims.

What is claimed is:

1. An air conditioning system provided with a plurality of compressors, a condenser, a four-way valve, and a plurality of heat exchangers,
   wherein at least one of the plurality of compressors is a capacity modulation compressor comprising:
   an electromotive driving unit including a stator having a coil winding portion to which power is supplied, and a rotor that has conductive bars, flux barriers, and permanent magnets inserted in the flux barriers, wherein the rotor rotates due to interactive electromagnetic forces, wherein an induction torque is generated between the conductive bars and the coil winding portion of the stator, wherein a reluctance torque is generated between the flux barriers and the coil winding portion of the stator and wherein a magnetic torque is generated between the permanent magnets and the coil winding portion of the stator, and the rotor has different load torques assigned in a startup operation and in a normal operation, and wherein a capacitor is electrically connected to the coil winding portion of the stator; and
   a plurality of compression units capable of selectively compressing a working fluid so that the compressing capacity of the plurality of compression units may be varied; and
   wherein the air conditioning system includes a controller for controlling operation of the plurality of heat exchangers, and for controlling operation of the plurality of compressors and a compressing capacity of the capacity modulation compressor according to a change in a required cooling capacity for the plurality of heat exchangers, so as to modulate a total capacity of the plurality of compressors in multiple steps.

2. The system of claim 1, wherein the plurality of compressors includes one fixed capacity and fixed speed compressor and one capacity modulation compressor, and a combination of compressing capacities of the plurality of compressors is modulated linearly.

3. The system of claim 1, wherein the plurality of compressors includes two or more capacity modulation compressors and a combination of compressing capacities of the plurality of compressors is modulated linearly.

4. The system of claim 1, wherein the plurality of compressors includes one inverter compressor and one capacity modulation compressor, and a combination of compressing capacities of the plurality of compressors is modulated linearly.

5. The system of claim 1, wherein the capacity modulation compressor includes a plurality of rotary compression units, a suction pipe passing through a casing to let a working fluid intaken by a cylinder, and a suction valve installed on the suction pipe to open or close the suction pipe, such that a total compressing capacity of the compression units varies depending on whether the suction valve is open or closed.

6. The system of claim 1, wherein, during a startup of the capacity modulation compressor, a compressing capacity of the plurality of compression units is lowered so that a relatively smaller load may be applied to the electromotive driving unit.

7. An air conditioning system provided with a plurality of compressors, a condenser, a four-way valve, and a plurality of heat exchangers,
   wherein at least one of the plurality of compressors is a capacity modulation compressor comprising:
   an electromotive driving unit including a stator having a coil winding portion to which power is supplied, and rotor that has conductive bars, flux barriers, and permanent magnets inserted in the flux barriers, wherein the rotor rotates due to interactive electromagnetic forces, wherein an induction torque is generated between the conductive bars and the coil winding portion of the stator, wherein a reluctance torque is generated between the flux barriers and the coil winding portion of the stator and wherein a magnetic torque is generated between the permanent magnets and the coil winding portion of the stator, and the rotor has different load torques assigned in a startup operation and in a normal operation, and wherein a capacitor is electrically connected to the coil winding portion of the stator; and
   a plurality of compression units capable of selectively compressing a working fluid so that the compressing capacity of the plurality of compression units may be varied; and
   wherein the air conditioning system includes a controller for controlling operation of the plurality of heat exchangers, and for controlling operation of the plurality of compressors and a compressing capacity of the capacity modulation compressor according to a change in a required cooling capacity for the plurality of heat exchangers, so as to modulate a total capacity of the plurality of compressors in multiple steps,
   wherein the capacity modulation compressor comprises a plurality of rotary compression units, and at least one of the rotary compression units includes a vane slit in which a vane is inserted, a back pressure space communicating with the vane slit from an external diameter side of the vane slit, and a vane control unit for supplying a suction pressure or a discharge pressure to a rear face of the vane to support the vane and for supplying a discharge pressure to a lateral face of the vane at the same time, such that a difference between the pressure applied to the rear face of the vane and the pressure applied to the lateral face of the vane makes the vane bound or released, thereby making the vane contacted to or separated from a rolling piston, and wherein a total compressing capacity of the rotary compression units is modulated by controlling the operation mode of at least one of the rotary compression units.

8. The system of claim 7, wherein the vane control unit includes a back pressure connection pipe via which a working fluid is introduced into the back pressure space; a low-pressure connection pipe connected to the back pressure connection pipe, via which a low-pressure non-compressed working fluid flows; a high-pressure connection pipe connected to the back pressure connection pipe, via which a high-pressure compressed working fluid flows; a valve for opening/closing the low-pressure connection pipe; and a valve for opening/closing the high-pressure connection pipe.

9. The system of claim 7, wherein the vane control unit includes a back pressure connection pipe via which a working fluid is introduced into the back pressure space; a low-pressure connection pipe connected to the back pressure connection pipe, via which a low-pressure non-compressed working fluid flows; a high-pressure connection pipe connected to the back pressure connection pipe, via which a high-pressure compressed working fluid flows; a switch valve for regulating the flow of a working fluid being introduced into the back pressure space through the back pressure connection pipe.

10. An air conditioning system provided with a plurality of compressors, a condenser, a four-way valve, and a plurality of heat exchangers, wherein at least one of the plurality of compressors is a capacity modulation compressor comprising:

an electromotive driving unit including a stator having a coil winding portion to which power is supplied, and rotor that has conductive bars, flux barriers, and permanent magnets inserted in the flux barriers, wherein the rotor rotates due to interactive electromagnetic forces, wherein an induction torque is generated between the conductive bars and the coil winding portion of the stator, wherein a reluctance torque is generated between the flux barriers and the coil winding portion of the stator and wherein a magnetic torque is generated between the permanent magnets and the coil winding portion of the stator, and the rotor has different load torques assigned in a startup operation and in a normal operation, and wherein a capacitor is electrically connected to the coil winding portion of the stator; and a plurality of compression units capable of selectively compressing a working fluid so that the compressing capacity of the plurality of compression units may be varied; and wherein the air conditioning system includes a controller for controlling operation of the plurality of heat exchangers, and for controlling operation of the plurality of compressors and a compressing capacity of the capacity modulation compressor according to a change in a required cooling capacity for the plurality of heat exchangers, so as to modulate a total capacity of the plurality of compressors in multiple steps, wherein the electromotive driving unit for the capacity modulation compressor includes a capacitor which has an optimized compressing capacity as the rotor produces a torque for the plurality of compression units to be able to compress a working fluid at a maximum compressing capacity in a synchronous speed, and which is connected to the stator coil.

11. The system of claim 10, wherein a compressing capacity applied to the plurality of compression units in a synchronous speed is determined to have a load torque less than a starting torque of the rotor during a startup.

12. An air conditioning system provided with a plurality of compressors, a condenser, a four-way valve, and a plurality of heat exchangers, wherein at least one of the plurality of compressors is a capacity modulation compressor comprising:

an electromotive driving unit including a stator having a coil winding portion to which power is supplied, and rotor that has conductive bars, flux barriers, and permanent magnets inserted in the flux barriers, wherein the rotor rotates due to interactive electromagnetic forces, wherein an induction torque is generated between the conductive bars and the coil winding portion of the stator, wherein a reluctance torque is generated between the flux barriers and the coil winding portion of the stator and wherein a magnetic torque is generated between the permanent magnets and the coil winding portion of the stator, and the rotor has different load torques assigned in a startup operation and in a normal operation, and wherein a capacitor is electrically connected to the coil winding portion of the stator; and a plurality of compression units capable of selectively compressing a working fluid so that the compressing capacity of the plurality of compression units may be varied; and wherein the air conditioning system includes a controller for controlling operation of the plurality of heat exchangers, and for controlling operation of the plurality of compressors and a compressing capacity of the capacity modulation compressor according to a change in a required cooling capacity for the plurality of heat exchangers, so as to modulate a total capacity of the plurality of compressors in multiple steps, wherein the electromotive driving unit for the capacity modulation compressor includes two or more capacitors connected to each other in parallel, and a switch for controlling an electrical connection of the capacitors.

13. The system of claim 12, wherein, during a startup, a compressing capacity of the plurality of compression units of the capacity modulation compressor is modulated to generate a load torque lower than a starting torque generated in summation of capacities of the capacitors after the switch is turned on.

14. The system of claim 12, further comprising:

a controller for controlling the plurality of compression units, so that during a startup a compressing capacity of the capacity modulation compressor generates a load torque lower than a starting torque generated in summation of capacities of the capacitors after the switch is turned on.

* * * * *